United States Patent
Wiegman

(10) Patent No.: US 11,427,305 B1
(45) Date of Patent: Aug. 30, 2022

(54) METHODS AND SYSTEMS FOR FLIGHT CONTROL FOR MANAGING ACTUATORS FOR AN ELECTRIC AIRCRAFT

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

(21) Appl. No.: 17/476,765

(22) Filed: Sep. 16, 2021

(51) Int. Cl.
| | |
|---|---|
| *B64C 13/16* | (2006.01) |
| *B64C 13/38* | (2006.01) |
| *G05B 23/02* | (2006.01) |
| *G06N 20/00* | (2019.01) |
| *B64D 27/24* | (2006.01) |

(52) U.S. Cl.
CPC ............ *B64C 13/16* (2013.01); *B64C 13/38* (2013.01); *B64D 27/24* (2013.01); *G05B 23/02* (2013.01); *G05B 2219/45071* (2013.01); *G06N 20/00* (2019.01)

(58) Field of Classification Search
USPC .......................................................... 701/3
See application file for complete search history.

(56) References Cited

U.S. PATENT DOCUMENTS

| | | | |
|---|---|---|---|
| 7,356,336 B2 | 4/2008 | Perez et al. | |
| 9,296,474 B1* | 3/2016 | Nguyen | G05B 13/048 |
| 10,740,216 B1* | 8/2020 | Parent | G06F 11/362 |
| 10,822,113 B2* | 11/2020 | Cutler | B64D 45/00 |
| 11,208,200 B1* | 12/2021 | Auerbach | G05D 1/0077 |
| 2004/0093130 A1 | 5/2004 | Osder et al. | |
| 2005/0114023 A1 | 5/2005 | Williamson et al. | |
| 2006/0126608 A1 | 6/2006 | Perreira et al. | |
| 2006/0180371 A1 | 8/2006 | Breed et al. | |
| 2010/0017049 A1 | 1/2010 | Swearingen et al. | |
| 2011/0180656 A1* | 7/2011 | Shue | G05B 19/0428 |
| | | | 244/17.13 |
| 2013/0274991 A1* | 10/2013 | Cheriere | G06F 11/0739 |
| | | | 701/32.9 |
| 2016/0159471 A1 | 6/2016 | Chan et al. | |
| 2017/0066531 A1 | 3/2017 | Mcadoo et al. | |
| 2017/0144761 A1 | 5/2017 | Bluvband et al. | |
| 2017/0277185 A1* | 9/2017 | Duda | G05D 1/101 |
| 2018/0364707 A1* | 12/2018 | Bosworth | A61B 5/0205 |
| 2020/0277080 A1* | 9/2020 | Wiegman | B60L 50/60 |
| 2020/0407060 A1* | 12/2020 | Hosseini | B64C 11/001 |

\* cited by examiner

*Primary Examiner* — Tyler D Paige
(74) *Attorney, Agent, or Firm* — Caldwell Intellectual Property Law

(57) ABSTRACT

A system for flight control for managing actuators for an electric aircraft is provided. The system includes a controller, wherein the controller is designed and configured to receive a sensor datum from at least a sensor, generate an actuator performance model as a function of the sensor datum, identify a defunct actuator of the electric aircraft as a function of the sensor datum and the actuator performance model, generate an actuator allocation command datum as a function of at least the actuator performance model and at least the identification of the defunct actuator, and perform a torque allocation as a function of the actuator allocation command datum.

20 Claims, 8 Drawing Sheets

//METHODS AND SYSTEMS FOR FLIGHT CONTROL FOR MANAGING ACTUATORS FOR AN ELECTRIC AIRCRAFT

FIELD OF THE INVENTION

The present invention generally relates to the field of flight control. In particular, the present invention is directed to methods system for flight control for managing actuators for an electric aircraft.

BACKGROUND

In electrically propelled vehicles, such as an electric vertical takeoff and landing (eVTOL) aircraft, it is essential to maintain the integrity of the aircraft until safe landing. It is also essential for the aircraft and its flight components to work in tandem to compensate for a malfunction or failure with one or more of its flight components. In some flights, a component of the aircraft may experience a malfunction or failure which will put the aircraft in an unsafe mode which will compromise the safety of the aircraft, passengers and onboard cargo.

SUMMARY OF THE DISCLOSURE

In an aspect a system for flight control for managing actuators for an electric aircraft is provided. The system includes a controller, wherein the controller is designed and configured to receive a sensor datum from at least a sensor, generate an actuator performance model as a function of the sensor datum, identify a defunct actuator of the electric aircraft as a function of the sensor datum and the actuator performance model, generate an actuator allocation command datum as a function of at least the actuator performance model and at least the identification of the defunct actuator, and perform a torque allocation as a function of the actuator allocation command datum.

In another aspect a method for flight control for managing actuators for an electric aircraft is provided. The method includes receiving, by a controller, a sensor datum from at least a sensor, generating an actuator performance model as a function of the sensor datum, identifying a defunct actuator of the electric aircraft as a function of the sensor datum and the actuator performance model, generating an actuator allocation command datum as a function of at least the actuator performance model and at least the identification of the defunct actuator, and performing a torque allocation as a function of the actuator allocation command datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
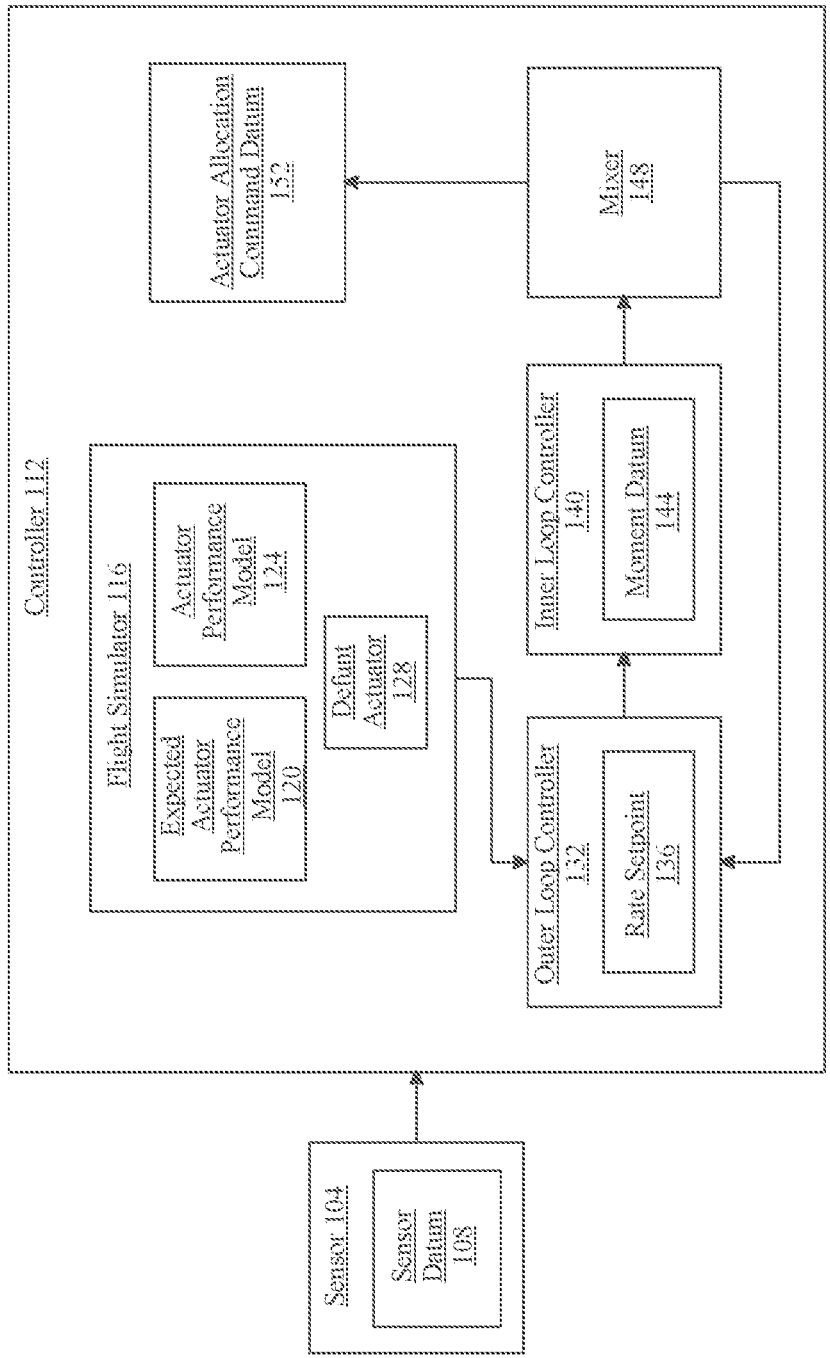
FIG. 1 is a block diagram of an exemplary embodiment of a system for flight control for managing actuators for an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to embodiments oriented as shown for exemplary purposes in FIG. 6. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

At a high level, aspects of the present disclosure are directed to systems and methods for flight control for managing actuators for an electric aircraft. In an embodiment, aspects of the present disclosure include a controller, wherein the controller is designed and configured to receive a sensor datum from at least a sensor, generate an actuator performance model as a function of the sensor datum, identify a defunct actuator of the electric aircraft as a function of the sensor datum and the actuator performance model, generate an actuator allocation command datum as a function of at least the actuator performance model and at least the identification of the defunct actuator, and perform a torque allocation as a function of the actuator allocation command datum. Exemplary embodiments illustrating aspects of the present disclosure are described below in the context of several specific examples Aspects of the present disclosure can be used to delineate torque output in the instance of a malfunction or failure of a flight component. For example and without limitation, aspects of the present disclosure can allocate more torque to remaining flight components to compensate for the malfunctioning flight component to maintain uninterrupted flight. Aspects of the present disclosure can be used to automatically allocate torque to aircraft flight components or actuators. Aspects of the present disclosure can also be used to inform a pilot of the aircraft of the malfunctioning flight component or actuators in which the pilot may manually operate the aircraft to the pilots satisfaction.

Aspects of the present disclosure can be used as a vehicle failure mode that indicates one or more specific actuators of a vehicle are malfunctioning. For example, one failure mode comprises a front left rotor failure whereas another failure mode comprises a back right rotor failure. A vehicle failure mode may indicate a group of failed actuators (e.g., where one of the actuators in the group is believed to have failed but is not specifically identified). In some embodiments, multiple models of the vehicle are determined based on multiple vehicle failure modes. An expected attitude and expected attitude rate may be determined based on each model. For example, expected attitude and attitude rates based on different actuator failures are determined. In some embodiments, the multiple expected attitudes and expected attitude rates are compared to an actual attitude and attitude rate as observed by an inertial measurement unit. In the event the actual values match or approximately match expected values of a model, a corresponding failure mode of the model may be determined to be in effect. For example, the one or more actuators indicated by the failure mode are determined to be malfunctioning actuators.

Aspects of the present disclosure can also be used to combines use of sensors and model-based estimation to provide a robust, lightweight, and inexpensive means to monitor and respond to actuator failures. Typical solutions may require speed controllers, sensors, or gauges designed to specifically measure output or function of actuators. Aspects of the present disclosure may measure whether the desired effect of the actuators is occurring by using high-level models rather than measuring a direct output of the actuators. Detecting high-level performance may provide greater accuracy. For example, a motor speed detector provides information on the motor but is unaware of a broken propeller, whereas a high-level model catches that the vehicle is not moving in a direction it was commanded to. Utilizing an existing inertial measurement unit to determine actuator operability in lieu of additional equipment may provide a lightweight solution in vehicles such as aircraft that have weight restrictions. Cost and complexity due to specialized monitoring equipment or repairs to actuator output monitoring equipment is eliminated.

Aspects of the present disclosure can be used to quickly detect faults in the vehicle and automatically perform responsive actions. Responsive actions may comprise corrective actions, such as adjusting flight controls, or warning actions, such as providing information to a vehicle operator.

Referring now to FIG. 1, a block diagram of an exemplary embodiment of a system 100 for flight control for managing actuators for an electric aircraft is illustrated. System 100 includes controller 112. Controller 112 may include a flight controller. Controller 112 may include a computing device. computing device may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device may include a single computing device operating independently, or may include two or more computing device operating in concert, in parallel, sequentially or the like; two or more computing devices may be included together in a single computing device or in two or more computing devices. computing device may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device may include but is not limited to, for example, a computing device or cluster of computing devices in a first location and a second computing device or cluster of computing devices in a second location. computing device may include one or more computing devices dedicated to data storage, security, distribution of traffic for load balancing, and the like. computing device may distribute one or more computing tasks as described below across a plurality of computing devices of computing device, which may operate in parallel, in series, redundantly, or in any other manner used for distribution of tasks or memory between computing devices. computing device may be implemented using a "shared nothing" architecture in which data is cached at the worker, in an embodiment, this may enable scalability of system 100 and/or computing device.

With continued reference to FIG. 1, computing device may be designed and/or configured to perform any method, method step, or sequence of method steps in any embodiment described in this disclosure, in any order and with any degree of repetition. For instance, computing device may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1 controller 112 and/or flight controller may be controlled by one or more Proportional-Integral-Derivative (PID) algorithms driven, for instance and without limitation by stick, rudder and/or thrust control lever with analog to digital conversion for fly by wire as described herein and related applications incorporated herein by reference. A "PID controller", for the purposes of this disclosure, is a control loop mechanism employing feedback that calculates an error value as the difference between a desired setpoint and a measured process variable and applies a correction based on proportional, integral, and derivative terms; integral and derivative terms may be generated, respectively, using analog integrators and differentiators constructed with operational amplifiers and/or digital integrators and differentiators, as a non-limiting example. A similar philosophy to attachment of flight control systems to sticks or other manual controls via pushrods and wire may be employed except the conventional surface servos, steppers, or other electromechanical actuator components may be connected to the cockpit inceptors via electrical wires. Fly-by-wire systems may be beneficial when considering the physical size of the aircraft, utility of for fly by wire for quad lift control and may be used for remote and autonomous use, consistent with the entirety of this disclosure. Controller 112 may harmonize vehicle flight dynamics with best handling qualities utilizing the minimum amount of complexity whether it be additional modes, augmentation, or external sensors as described herein.

With continued reference to FIG. 1, controller 112 is configured to receive sensor datum 108 from at least a sensor. A "sensor," for the purposes of this disclosure, is an electronic device configured to detect, capture, measure, or combination thereof, one or more elements of data describing external and/or electric vehicle conditions. Sensor 104 may be integrated and/or connected to at least an actuator, a portion thereof, or any subcomponent thereof. Sensor 104 may include a photodiode configured to convert light, heat, electromagnetic elements, and the like thereof, into electrical current for further analysis and/or manipulation. Sensor 104 may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. The plurality of datum captured by sensor 104 may include circuitry, computing devices, electronic components or a combination thereof that translates into at least an electronic signal configured to be transmitted to another electronic component. Sensor 104 may be disposed on at least an actuator of the electric aircraft. An "actuator," for the purpose of this disclosure, is any flight component or any part of an electric aircraft that helps it to achieve physical movements by converting energy, often electrical, air, or hydraulic, into mechanical force and enable movement. In a non-limiting embodiment, the at least an actuator may include, but not limited to, pistons, forward pushers, vertical propulsors, motors, rotors, ailerons, rudders, and the like thereof. "Disposed," for the purpose of this disclosure, is the physical placement of a computing device on an actuator. In a non-limiting embodiment, actuator may include a flight component. In a non-limiting embodiment, sensor 104 may include a plurality of individual sensors disposed on each actuator of the electric aircraft.

With continued reference to FIG. 1, sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 104 may include, but not limited to, torque sensor, gyroscope, accelerometer, magnetometer, inertial measurement unit (IMU), pressure sensor, force sensor, proximity sensor, displacement sensor, vibration sensor, LIDAR sensor, and the like. In a non-limiting embodiment sensor 104 ranges may include a technique for the measuring of distances or slant range from an observer including sensor 104 to a target which may include a plurality of outside parameters. "Outside parameter," for the purposes of this disclosure, refer to environmental factors or physical electric vehicle factors including health status that may be further be captured by a sensor 104. Outside parameter may include, but not limited to air density, air speed, true airspeed, relative airspeed, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of the electric aircraft itself including, but not limited to, remaining fuel or battery. Outside parameter may include at least an environmental parameter. Environmental parameter may be any environmentally based performance parameter as disclosed herein. Environment parameter may include, without limitation, time, pressure, temperature, air density, altitude, gravity, humidity level, airspeed, angle of attack, and debris, among others. Environmental parameters may be stored in any suitable datastore consistent with this disclosure. Environmental parameters may include latitude and longitude, as well as any other environmental condition that may affect the landing of an electric aircraft. Technique may include the use of active range finding methods which may include, but not limited to, light detection and ranging (LIDAR), radar, sonar, ultrasonic range finding, and the like. In a non-limiting embodiment, sensor 104 may include at least a LIDAR system to measure ranges including variable distances from sensor 104 to a potential landing zone or flight path. LIDAR systems may include, but not limited to, a laser, at least a phased array, at least a microelectromechanical machine, at least a scanner and/or optic, a photodetector, a specialized GPS receiver, and the like. In a non-limiting embodiment, sensor 104 including a LIDAR system may target an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment the LIDAR system may include a topographic LIDAR and a bathymetric LIDAR, wherein the topographic LIDAR that may use near-infrared laser to map a plot of a land or surface representing a potential landing zone or potential flight path while the bathymetric LIDAR may use water-penetrating green light to measure seafloor and various water level elevations within and/or surrounding the potential landing zone. In a non-limiting embodiment, electric aircraft may use at least a LIDAR system as a means of obstacle detection and avoidance to navigate safely through environments to reach a potential landing zone. Sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, sensor 104 may be mechanically and communicatively connected to one or more throttles. "Mechanically connected," for the purpose of this disclosure, is a connection in which an electrical device is directly connected to another electrical device in which the connection is configured to support the transfer of torque. The throttle may be any throttle as described herein, and in non-limiting examples, may include pedals, sticks, levers, buttons, dials, touch screens, one or more computing devices, and the like. Additionally, a right-hand floor-mounted lift lever may be used to control the amount of thrust provided by the lift fans or other propulsors. The rotation of a thumb wheel pusher throttle may be mounted on the end of this lever and may control the amount of torque provided by the pusher motor, or one or more other propulsors, alone or in combination. Any throttle as described herein may be consistent with any throttle described in U.S. patent application Ser. No. 16/929,206 and titled, "Hover and Thrust Control Assembly for Dual-Mode Aircraft", which is incorporated herein in its entirety by reference. At least a sensor 104 may be mechanically and communicatively connected to an inceptor stick. The pilot input may include a left-hand strain-gauge style STICK for the control of roll, pitch and yaw in both forward and assisted lift flight. A 4-way hat switch on top of the left-hand stick enables the pilot to set roll and pitch trim. Any inceptor stick described herein may be consistent with any inceptor or directional control as described in U.S. patent application Ser. No. 17/001,845 and titled, "A Hover and Thrust Control Assembly for a Dual-Mode Aircraft", which is incorporated herein in its entirety by reference.

Referring still to FIG. 1, at least a sensor 104 may be mechanically and communicatively connected to a foot pedal. Flight control system 104 may incorporate wheeled landing gear steerable by differential braking accessed by floor mounted pedals; in the event of installing such a foot actuated "caveman" infrastructure, yaw control also may be affected through differential foot pressure. A stick may be calibrated at zero input (relaxed state) and at the stops in pitch and roll. The calibration may be done in both directions of roll and both directions of pitch. Any asymmetries may be handled by a bilinear calibration with the breakpoint at the neutral point. Likewise, a yaw zero point may correspond to a relaxed state of an inceptor stick. The full-scale torque in each twist direction may be independently calibrated to the maximum torque seen in the calibration process in that direction. In all phases of flight, the control surface deflections may be linearly mapped to their corresponding maximum stick deflections and neutral position. In the case of roll, where there may be more aileron deflection in the trailing edge up direction, the degrees of deflection per pilot input unit may be different in each direction, such that full surface deflection may be not reached until full stick deflection. When the lift fans are engaged, the pilot's stick inputs may correspond to roll and pitch attitude (+/−30 deg) and yaw rate (+/−60 deg/second) commands, which are also linearly mapped to the full range of stick travel. A breakout force of 2-3 Newtons (0.5 lbf minimums mil spec 1797 min breakout force) measured at center of stick grip position may be applied prior to the linear mapping. Breakout force prevents adverse roll yaw coupling. In order to remove the need for constant control input in steady forward flight, pitch and roll trim may be available. Pitch trim may be limited to +7 deg pitch up trim and −5 deg pitch down trim, which may be sufficient to trim for level flight over the entire center of gravity and cruise airspeed range in non-limiting examples. Roll trim limited to 2 degrees (average between the ailerons) may be also available. The trim may be applied after the breakout force to change the input that center stick corresponds to. This trimmed command applies to both the attitude commands when the lift rotors are powered, and the control surface deflections at all times. In order to ensure the pilot can always access the full capability of the aircraft, the mapping below from pre-trim input to post-trim input may be used when trim is nonzero. Note that with positive trim, the effective sensitivity in the positive direction has decreased while the sensitivity in the negative direction has increased. This is a necessary byproduct of enforcing the constraint that full stick deflection yields full control surface deflection. The lift lever has very low additional breakout torque and requires a constant (but adjustable) torque of 3.1 Nm during movement, which translates to 2 lbf at the intended grip position. Control of the lift motors may be only active when the assisted lift lever may be raised above 3.75 degrees from the full down stop (out of 25 degrees total). This may represent a debounce mechanism that may be determined based on the friction of the assisted lift lever, the mass and the expected cockpit vibration levels. A mechanical detent may be installed on the lift lever at an angle corresponding to 15% average torque in order to provide kinesthetic feedback to the pilot of the minimum lift lever setting which provides adequate control authority via the lift fans.

With continued reference to FIG. 1, flight control system 100 may include at least a sensor 104 which may further include a sensor suite. One or more sensors may be communicatively connected to at least a pilot control, the manipulation of which, may constitute at least an aircraft command. "Communicative connecting", for the purposes of this disclosure, refers to two or more components electrically, or otherwise connected and configured to transmit and receive signals from one another. Signals may include electrical, electromagnetic, visual, audio, radio waves, or another undisclosed signal type alone or in combination. Any datum or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor 104 may include circuitry, computing devices, electronic components or a combination thereof that translates input datum 108 into at least an electronic signal configured to be transmitted to another electronic component. At least a sensor communicatively connected to at least a pilot control may include a sensor disposed on, near, around or within at least pilot control. At least a sensor may include a motion sensor. "Motion sensor", for the purposes of this disclosure refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. At least a sensor may include, torque sensor, gyroscope, accelerometer, torque sensor, magnetometer, inertial measurement unit (IMU), pressure sensor, force sensor, proximity sensor, displacement sensor, vibration sensor, among others. At least a sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

Still referring to FIG. 1, sensor 104 may include a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. At least a sensor may be configured to detect pilot input from at least pilot control. At least pilot control may include a throttle lever, inceptor stick, collective pitch control, steering wheel, brake pedals, pedal controls, toggles, joystick. One of ordinary skill in the art, upon reading the entirety of this disclosure would appreciate the variety of pilot input controls that may be present in an electric aircraft consistent with the present disclosure. Inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety.

Further referring to FIG. 1, at least pilot control may be physically located in the cockpit of the aircraft or remotely located outside of the aircraft in another location communicatively connected to at least a portion of the aircraft. "Communicatively connection", for the purposes of this disclosure, is a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may be performed via a bus or other facility for intercommunication between elements of a computing device. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. At least pilot control may be configured to receive pilot input. Pilot input may include a physical manipulation of a control like a pilot using a hand and arm to push or pull a lever, or a pilot using a finger to manipulate a switch. Pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to sensor 104.

In an embodiment, and still referring to FIG. 1, sensor 104 may be attached to one or more pilot inputs and attached to one or more pilot inputs, one or more portions of an aircraft, and/or one or more structural components, which may include any portion of an aircraft as described in this disclosure. As used herein, a person of ordinary skill in the art would understand "attached" to mean that at least a portion of a device, component, or circuit is connected to at least a portion of the aircraft via a mechanical connection. Said mechanical connection can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling can be used to join two pieces of rotating electric aircraft components. Control surfaces may each include any portion of an aircraft that can be moved or adjusted to affect altitude, airspeed velocity, groundspeed velocity or direction during flight. For example, control surfaces may include a component used to affect the aircrafts' roll and pitch which may comprise one or more ailerons, defined herein as hinged surfaces which form part of the trailing edge of each wing in a fixed wing aircraft, and which may be moved via mechanical means such as without limitation servomotors, mechanical linkages, or the like, to name a few. As a further example, control surfaces may include a rudder, which may include, without limitation, a segmented rudder. The rudder may function, without limitation, to control yaw of an aircraft. Also, control surfaces may include other flight control surfaces such as propulsors, rotating flight controls, or any other structural features which can adjust the movement of the aircraft. A "control surface" as described herein, is any form of a mechanical linkage with a surface area that interacts with forces to move an aircraft. A control surface may include, as a non-limiting example, ailerons, flaps, leading edge flaps, rudders, elevators, spoilers, slats, blades, stabilizers, stabilators, airfoils, a combination thereof, or any other mechanical surface are used to control an aircraft in a fluid medium. Persons skilled in the art, upon reviewing the entirety of this disclosure, will be aware of various mechanical linkages that may be used as a control surface, as used and described in this disclosure.

With continued reference to FIG. 1, controller 112 is configured to receive sensor datum 108 from sensor 104 in which sensor 104 may be configured to detect sensor datum 108. A "sensor datum," for the purpose of this disclosure, is any datum or element of data describing parameters captured by a sensor describing the outside environment and physical values describing the performance or qualities of flight components of the electric aircraft. In a non-limiting embodiment, sensor datum 108 may include any data captured by any sensor as described in the entirety of this disclosure. Additionally and alternatively, sensor datum 108 may include any element or signal of data that represents an electric aircraft route and various environmental or outside parameters. In a non-limiting embodiment, sensor datum may include an element of that representing the safest, most efficient, shortest, or a combination thereof, flight path. In a non-limiting embodiment, sensor datum 108 may include a degree of torque that may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 1, sensor datum 108 may include an input datum. An "input datum," for the purpose of this disclosure, is an element of data describing a manipulation of one or more pilot input controls that correspond to a desire to affect an aircraft's trajectory as a function of the movement of one or more flight components and/or actuators. At least a pilot control may be communicatively connected to any other component presented in system, the communicative connection may include redundant connections configured to safeguard against single-point failure. Pilot input may indicate a pilot's desire to change the heading or trim of an electric aircraft. Pilot input may indicate a pilot's desire to change an aircraft's pitch, roll, yaw, or throttle. Aircraft trajectory is manipulated by one or more control surfaces and propulsors working alone or in tandem consistent with the entirety of this disclosure, hereinbelow. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft.

"Throttle", for the purposes of this disclosure, refers to an aircraft outputting an amount of thrust from a propulsor. Pilot input, when referring to throttle, may refer to a pilot's desire to increase or decrease thrust produced by at least a propulsor. In a non-limiting embodiment, input datum may include an electrical signal. In a non-limiting embodiment, input datum may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. At least a sensor may include circuitry, computing devices, electronic components or a combination thereof that translates pilot input into at input datum configured to be transmitted to any other electronic component.

With continued reference to FIG. 1, sensor datum 108 may include a flight datum. A "flight datum," for the purpose of this disclosure, is any datum or element of data describing physical parameters of individual actuators and/or flight components of an electric aircraft and/or logistical parameters of the electric aircraft. In a non-limiting embodiment, flight datum may include a plurality of data describing the health status of an actuator of a plurality of actuators. In a non-limiting embodiment, the plurality of data may include a plurality of failure data for a plurality of actuators. In a non-limiting embodiment, safety datum may include a measured torque parameter that may include the remaining vehicle torque of a flight component among a plurality of flight components. A "measured torque parameter," for the purposes of this disclosure, refer to a collection of physical values representing a rotational equivalence of linear force. A person of ordinary skill in the art, after viewing the entirety of this disclosure, would appreciate the various physical factors in measuring torque of an object. For instance and without limitation, remaining vehicle torque may be consistent with disclosure of remaining vehicle torque in U.S. patent application Ser. No. 17/197,427 and titled "SYSTEM AND METHOD FOR FLIGHT CONTROL IN ELECTRIC AIRCRAFT", which is incorporated herein by reference in its entirety. Remaining vehicle torque may include torque available at each of a plurality of flight components at any point during an aircraft's entire flight envelope, such as before, during, or after a maneuver. For example, and without limitation, torque output may indicate torque a flight component must output to accomplish a maneuver; remaining vehicle torque may then be calculated based on one or more of flight component limits, vehicle torque limits, environmental limits, or a combination thereof. Vehicle torque limit may include one or more elements of data representing maxima, minima, or other limits on vehicle torques, forces, attitudes, rates of change, or a combination thereof. Vehicle torque limit may include individual limits on one or more flight components, structural stress or strain, energy consumption limits, or a combination thereof. Remaining vehicle torque may be represented, as a non-limiting example, as a total torque available at an aircraft level, such as the remaining torque available in any plane of motion or attitude component such as pitch torque, roll torque, yaw torque, and/or lift torque. In a non-limiting embodiment, controller 112 may mix, refine, adjust, redirect, combine, separate, or perform other types of signal operations to translate pilot desired trajectory into aircraft maneuvers. In a nonlimiting embodiment a pilot may send a pilot input at a press of a button to capture current states of the outside environment and subsystems of the electric aircraft to be displayed onto an output device in pilot view. The captured current state may further display a new focal point based on that captured current state. In a non-limiting embodiment, controller 112 may condition signals such that they can be sent and received by various components throughout the electric vehicle. In a non-limiting embodiment, flight datum may include at least an aircraft angle. At least an aircraft angle may include any information about the orientation of the aircraft in three-dimensional space such as pitch angle, roll angle, yaw angle, or some combination thereof. In non-limiting examples, at least an aircraft angle may use one or more notations or angular measurement systems like polar coordinates, cartesian coordinates, cylindrical coordinates, spherical coordinates, homogenous coordinates, relativistic coordinates, or a combination thereof, among others. In a non-limiting embodiment, flight datum may include at least an aircraft angle rate. At least an aircraft angle rate may include any information about the rate of change of any angle associated with an electrical aircraft as described herein. Any measurement system may be used in the description of at least an aircraft angle rate.

With continued reference to FIG. 1, controller 112 is configured to receive sensor datum 108 from sensor 104. In a non-limiting embodiment, controller 112 may include a plurality of physical controller area network buses communicatively connected to the aircraft and sensor 104. A "physical controller area network bus," as used in this disclosure, is vehicle bus unit including a central processing unit (CPU), a CAN controller, and a transceiver designed to allow devices to communicate with each other's applications without the need of a host computer which is located physically at the aircraft. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks. For instance and without limitation, CAN bus unit may be consistent with disclosure of CAN bus unit in U.S. patent application Ser. No. 17/218,342 and titled "METHOD AND SYSTEM FOR VIRTUALIZING A PLURALITY OF CONTROLLER AREA NETWORK BUS UNITS COMMUNICATIVELY CONNECTED TO AN AIRCRAFT," which is incorporated herein by reference in its entirety. In a non-limiting embodiment, the controller 112 may receive the sensor datum 108 from the sensor 104 by a physical CAN bus unit. In a non-limiting embodiment, the sensor 104 may include a physical CAN bus unit to detect sensor datum 108 in tandem with a plurality of individual sensors from a sensor suite. Physical CAN bus unit may include multiplex electrical wiring for transmission of multiplexed signaling. Physical CAN bus unit 104 may include message-based protocol(s), wherein the invoking program sends a message to a process and relies on that process and its supporting infrastructure to then select and run appropriate programing. A plurality of physical CAN bus units may be located physically at the aircraft may include mechanical connection to the aircraft, wherein the hardware of the physical CAN bus unit is integrated within the infrastructure of the aircraft.

In a non-limiting embodiment, controller 112 may be responsible only for mapping the pilot inputs such as input datum, attitude such as at least an aircraft angle, and body angular rate measurement such as at least an aircraft angle rate to motor torque levels necessary to meet the input datum. In a non-limiting exemplary embodiment, controller 112 may include the nominal attitude command (ACAH) configuration, the controller 112 may make the vehicle attitude track the pilot attitude while also applying the pilot-commanded amount of assisted lift and pusher torque which may be encapsulated within actuator allocation command datum 152. The flight controller is responsible only for mapping the pilot inputs, attitude, and body angular rate measurements to motor torque levels necessary to meet the input datum. In the nominal attitude command (ACAH) configuration, controller 112 makes the vehicle attitude track the pilot attitude while also applying the pilot commanded amount of assisted lift and pusher torque. In a non-limiting embodiment, controller 112 may include the calculation and control of avionics display of critical envelope information i.e., stall warning, vortex ring state, pitch limit indicator, angle of attack, transition envelopes, etc. In a non-limiting embodiment, controller 112 may calculate, command, and control trim assist, turn coordination, pitch to certain gravitational forces, automation integration: attitude, position hold, LNAV, VNAV etc., minimum hover thrust protection, angle of attack limits, etc., precision Autoland, other aspects of autopilot operations, advanced perception of obstacles for 'see and avoid' missions, and remote operations, among others.

With continued reference to FIG. 1, controller 112 is configured to generate actuator performance model 120 as a function of the sensor datum 108. An "actuator performance model," for the purpose of this disclosure, is an analytical and/or interactive visualization and/or mathematical model regarding aircraft operation and/or performance capabilities. In a non-limiting embodiment, actuator performance model 124 may include a model depicting the performance of the aircraft in which one or more of the actuators are malfunctioning or failing. In a non-limiting embodiment, actuator performance model 124 may be generated during a flight or after a flight has occurred. For example and without limitation, actuator performance model 124 may depict the performance of the aircraft and the aircraft actuators in real time as it is flying in the air. In a non-limiting embodiment, actuator performance model 124 may include a depiction of the flight of the aircraft. In a non-limiting embodiment, actuator performance model 124 may include a plurality of performance parameters include, but not limited to, aircraft velocity, attitude, actuator torque output, and the like thereof. In a non-limiting embodiment, actuator performance model 124 may highlight an abnormality of an actuator and a plurality of performance parameters associated with that abnormal actuator. Persons skilled in the art, upon reviewing the entirety of this disclosure, will be aware of the various embodiments of a simulation and/or model in the context of visualization and analysis consistent with this disclosure.

With continued reference to FIG. 1, controller 112 may include flight simulator 116, wherein the flight simulator may be configured to generate actuator performance model 124. A "flight simulator" is a program or set of operations that simulate flight. In some cases, flight simulator may simulate flight within an environment, for example an environmental atmosphere in which aircraft fly, airports at which aircraft take-off and land, and/or mountains and other hazards aircraft attempt to avoid crashing into. For instance and without limitation, flight simulator may be consistent with flight simulator in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT," which is incorporated herein by reference in its entirety. In some cases, an environment may include geographical, atmospheric, and/or biological features. In some cases, flight simulator 116 may model an artificial and/or virtual aircraft in flight as well as an environment in which the artificial and/or virtual aircraft flies. In some cases, flight simulator 116 may include one or more physics models, which represent analytically or through data-based, such as without limitation machine-learning processes, physical phenomenon. Physical phenomenon may be associated with an aircraft and/or an environment. For example, some versions of flight simulator 116 may include thermal models representing aircraft components by way of thermal modeling. Thermal modeling techniques may, in some cases, include analytical representation of one or more of convective hear transfer (for example by way of Newton's Law of Cooling), conductive heat transfer (for example by way of Fourier conduction), radiative heat transfer, and/or advective heat transfer. In some cases, flight simulator 116 may include models representing fluid dynamics. For example, in some embodiments, flight simulator may include a representation of turbulence, wind shear, air density, cloud, precipitation, and the like. In some embodiments, flight simulator 116 may include at least a model representing optical phenomenon. For example, flight simulator 116 may include optical models representative of transmission, reflectance, occlusion, absorption, attenuation, and scatter. Flight simulator 116 may include non-analytical modeling methods; for example, the flight simulator may include, without limitation, a Monte Carlo model for simulating optical scatter within a turbid medium, for example clouds. In some embodiments, flight simulator 116 may represent Newtonian physics, for example motion, pressures, forces, moments, and the like. An exemplary flight simulator may include Microsoft Flight Simulator from Microsoft of Redmond, Wash., U.S.A.

With continued reference to FIG. 1, flight simulator 116 may be configured to generate expected actuator performance model 124. An "expected actuator performance model," for the purpose of this disclosure, is any actuator performance model of the aircraft that embodies an ideal or expected analytical and/or interactive visualization regarding aircraft operation and/or performance capabilities. In a non-limiting embodiment, expected actuator performance model 124 may include any actuator performance model simulating a plurality of actuator parameters operating within a predetermined tolerance. For example and without limitation, the predetermined tolerance may include upper and lower limits for a plurality of actuator parameters such as, but not limited to, angle of attack, attitude distance, rotor output, and the like thereof, in which expected actuator performance model 124 may be configured to simulate. In a non-limiting embodiment, expected actuator performance model 124 may include an actuator performance model that depicts a performance model in which none of the actuators are malfunctioning. For example and without limitation, expected actuator performance model 124 may be a model depicting a performance of what the aircraft should be based on the ideal, expected, or initial performance the aircraft actuators are intended to perform. For example and without limitation, expected actuator performance model 124 includes peak performance output including, but not limited to, power consumption, maximum torque output, cruising torque output, maximum attitude, cruising attitude, maximum velocity, cruising velocity, and the like thereof. For example and without limitation, expected actuator performance model 124 may highlight individual performance parameters of each actuator based on a sensor disposed on each actuator. In a non-limiting embodiment, expected actuator performance model 124 can be used to assess the performance of the aircraft actuators by comparing expected actuator performance model 124 to actuator performance model 120 and analyzing the difference between the data from the two models. In a non-limiting embodiment, controller 112 may feed flight simulator 116 the ideal and/or peak performance parameters of an aircraft and its actuators to simulate expected actuator performance model 120 based on those ideal and/or peak performance parameters. In a non-limiting embodiment, expected actuator performance model 120 may include a plurality of expected actuator performance model 124 depicting a different failure modes of an aircraft and/or an aircraft's actuators. For example and without limitation, a rotor may fail by outputting max thrust, outputting zero thrust, or be stuck at an intermediate setting. In some embodiments, models are determined based on and/or for various actuator settings. In various embodiments, only highly likely or relatively dangerous actuator failure modes are considered and modeled. For example, a rotor may be modeled for a zero-output case but not for a pinned high case. Persons skilled in the art, upon reviewing the entirety of this disclosure, will be aware of the various models and comparisons consistent with this disclosure.

With continued reference to FIG. 1, flight simulator 116 may be configured to simulate a virtual representation. The virtual representation may represent a virtualization of actuator performance model 124 and/or expected actuator performance model 120. A "virtual representation" includes any model or simulation accessible by computing device which is representative of a physical phenomenon, for example without limitation at least an actuator. In some cases, virtual representation may be interactive with flight simulator 116. For example, in some cases, data may originate from virtual representation and be input into flight simulator 116. Alternatively or additionally, in some cases, the virtual representation may modify or transform data already available to flight simulator 116. The virtual representation may include an electric aircraft and/or one or more actuator of the electric aircraft. In some cases, at least electric aircraft may include an electric vertical take-off and landing (eVTOL) aircraft, for example a functional flightworthy eVTOL aircraft. In some cases, at least a virtual representation may include a virtual controller area network. Virtual controller area network may include any virtual controller area network. A controller area network may include a plurality of physical controller area network buses communicatively connected to the aircraft, such as an electronic vertical take-off and landing (eVTOL) aircraft as described in further detail below. A physical controller area network bus may be vehicle bus unit including a central processing unit (CPU), a CAN controller, and a transceiver designed to allow devices to communicate with each other's applications without the need of a host computer which is located physically at the aircraft. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks; circuit elements may be used to implement CAN bus components and/or constituent parts as described in further detail below. Physical CAN bus unit may include multiplex electrical wiring for transmission of multiplexed signaling. Physical CAN bus unit may include message-based protocol(s), wherein the invoking program sends a message to a process and relies on that process and its supporting infrastructure to then select and run appropriate programing. A plurality of physical CAN bus units located physically at the aircraft may include mechanical connection to the aircraft, wherein the hardware of the physical CAN bus unit is integrated within the infrastructure of the aircraft. Physical CAN bus units may be communicatively connected to the aircraft and/or with a plurality of devices outside of the aircraft.

With continued reference to FIG. 1, controller 112 is configured to identify defunct actuator 128 of the electric aircraft as a function of the sensor datum and the actuator performance model. A "defunct actuator," for the purpose of this disclosure, is a malfunctioning or failing actuator of an electric aircraft. In a non-limiting embodiment, defunct actuator 128 may include any actuator that may produce abnormal outputs. For example and without limitation, defunct actuator 128 may output a torque of 1.5 Newton-metre (Nm) while the remaining actuators may output a torque of 3.6 Nm. In a non-limiting embodiment, actuators may include different failure modes which are represented by various expected actuator performance model 120. For example, a rotor may fail by outputting max thrust, outputting zero thrust, or be stuck at an intermediate setting. In some embodiments, models are determined based on and/or for various actuator settings. In various embodiments, only highly likely or relatively dangerous actuator failure modes are considered and modeled. For example, a rotor may be modeled for a zero-output case but not for a pinned high case.

In a non-limiting embodiment, controller 112 may compare actuator performance model 124 with expected actuator performance model 120 to identify defunct actuator 128. For example and without limitation, controller 112 may sort models based on their expected metrics and select the model that has expected metrics that closely match actual or observed metrics. In one example, the metrics compared include attitude and rates of change in attitude of the aircraft. In some embodiments, controller 112 may compares observed metrics of the aircraft to expected metrics of the aircraft in an operable mode (e.g. no actuator failures associated with a "no failure" model). In a non-limiting embodiment, controller 112 may receive from flight simulator 116, a plurality of expected actuator performance model 120 which may include a model for every possible failure mode. A "failure mode," for the purpose of this disclosure, is any state of the electric aircraft in which one or more actuators are defunct, malfunctioning, or failing. For example and without limitation, in an aircraft comprising four rotors, a model is determined for a first rotor failure, a second rotor failure, a third rotor failure, a fourth rotor failure, a first and second rotor failure, a first and third rotor failure, a first and fourth rotor failure, a second and third rotor failure, and a second and fourth rotor failure. Multiple additional models may be determined including a model for no rotor failure and all rotor failure in addition to a first, second, and third rotor failure and a second, third, and fourth rotor failure. In some embodiments, the number of models determined is equal to the number of actuators squared plus one. In some embodiments, the number of considered failure modes is less than the total possible failure modes. For example, models may not be determined for less likely failure modes in order to limit computations performed. Persons skilled in the art, upon reviewing the entirety of this disclosure, will be aware of various embodiments of failure modes used to identify a defunct actuator 128 consistent with this disclosure. In a non-limiting embodiment, the plurality of expected actuator performance model 120 may be sorted based on similarity to an observed flight datum. For example, an expected flight datum including expected attitude and expected attitude rate given a failure mode is determined or otherwise generated based on and/or for each model. In some embodiments, the models are sorted based on how closely their corresponding expected attitude and expected attitude rate matches the observed attitude and attitude rate. The sorted models may result in a sorted list of failure modes from most likely to least likely. For example, in the event a first rotor failure mode has a corresponding expected attitude that is 0.2 off from the observed attitude and an expected attitude rate that is 0.1 off from the observed attitude rate whereas a second rotor failure mode has a corresponding expected attitude that is 0.7 off from the observed attitude and an expected attitude rate that is 0.9 off from the observed attitude, the first rotor failure is determined to be more likely than the second rotor failure mode. In some embodiments, the summation of the difference between expected attitude and observed attitude and the difference between expected attitude rate and observed attitude rate is used to sort the models. In some embodiments, expected attitude is weighted more than expected attitude rate or vice versa. A model's similarity to observed metrics may be determined using various calculations based on the expected and observed values in various embodiments. In a non-limiting embodiment, controller 112 may identify defunct actuator 128 or one or more defunct actuators 128 based on the sorted model. For example, the failure mode top of the sorted list may be selected. Actuator failures that correspond to the failure mode are determined to be in effect.

With continued reference to FIG. 1, controller 112 is configured to generate actuator allocation command datum 152 as a function of at least the actuator performance model 120 and at least the identification of defunct actuator 128. An "actuator allocation command datum," for the purpose of this disclosure, is command for a torque allocation to be applied to one or more actuators of the electric aircraft. In a non-limiting embodiment, actuator allocation command datum 152 may include unique torque allocations for each actuator. For example and without limitation, actuator allocation command datum 152 may instruct each functioning actuator to allocate a torque output of 4 Nm and instruct defunct actuator 128 to allocate a torque output of 0.4 Nm. For example and without limitation, actuator allocation command datum 152 may instruct one or more defunct actuators 128 to command a torque of 0 Nm and the remaining functioning actuators a torque of 6 Nm. In a non-limiting embodiment, actuator allocation command datum 152 may be generated as a function of a torque allocation. For instance and without limitation, torque allocation may be consistent with the description of torque allocation in U.S. patent application Ser. No. 17/197,427 filed on Mar. 10, 2021 and titled, "SYSTEM AND METHOD FOR FLIGHT CONTROL IN ELECTRIC AIRCRAFT", which is incorporated herein in its entirety by reference. In a non-limiting embodiment, controller 112 may generate actuator allocation command datum 152 as a function of a machine-learning model. In a non-limiting embodiment, machine-learning model may generate actuator allocation command datum 152 given sensor datum 108, actuator performance model 124, and/or identification of defunct actuator 128 and data describing it as inputs. In a non-limiting embodiment, machine-learning model may generate actuator allocation command datum 152 using moment datum 144 as an input. In a non-limiting embodiment, controller 112 may receive training data correlating sensor datum 108 to actuator performance model 124 which may include a failure mode or a model identifying defunct actuator 128.

With continued reference to FIG. 1, controller 112 may comprises outer loop controller 132, wherein outer loop controller 132 may be configured to generate rate setpoint 136 as a function of sensor datum 108 and the identification of defunct actuator 128. Outer loop controller 132 may include one or more computing devices consistent with this disclosure and/or one or more components and/or modules thereof. For instance and without limitation, outer loop controller may be consistent with outer loop controller in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. Outer loop controller 132 may be implemented using a microcontroller, a hardware circuit such as an FPGA, system on a chip, and/or application specific integrated circuit (ASIC). Outer loop controller 132 may be implemented using one or more analog elements such as operational amplifier circuits, including operational amplifier integrators and/or differentiators. Outer loop controller 132 may be implemented using any combination of the herein described elements or any other combination of elements suitable therefor. Outer loop controller 132 may be configured to input one or more parameters, such as input datum 108 and/or at least an aircraft angle 116 and output rate setpoint 136. Outer loop controller 132 may periodically detect one or more errors between aircraft angles and commanded angles in any one of pitch, roll, yaw, or a combination thereof. For example, and without limitation, outer loop controller 132 may detect the error between the commanded and detected aircraft angle and command one or more propulsors and or flight components consistent with the entirety of this disclosure to reduce said error in one or more iterations. Outer loop controller 132 may be closed by a PI controller with integral anti-windup via back-calculation. Additional logic is present to prevent integral windup while grounded on a not perfectly level surface. Gains may be reduced at large amplitude in order to reduce overshoot on large inputs. This excessive overshoot may be due in part to linear systems having constant percent overshoot, so at larger amplitudes, the absolute value of the overshoot becomes (potentially unacceptably) large. Additionally, on large step inputs, motor saturation (a nonlinear effect) may occur for extended periods of time and causes overshoot to increase. In extreme cases, the occurrence of motor saturation without any gain reduction may lead to unrecoverable tumbles. This gain reduction may be implemented as a (soft) rate command limit. In particular, this reduction may be given by the piecewise combination of a linear function and the square root function. Note that the input/output relationship may be monotonically increasing, so increased angle error or integral action always makes it through to the inner loop, even if the gain reduction may be engaged. For inputs less than the knee, set to 20 deg/s, the input may be not changed. Above the knee, the output may be given by sign(input)*sqrt(abs(input)*knee). The effective gain at any point to the right of the knee may be then given by sqrt(abs(input)*knee)/input. This gain decrease at large amplitudes has been shown in simulation to stabilize the vehicle when subject to inputs that would otherwise destabilize the vehicle into an unrecoverable tumble. For the vast majority of maneuvers, this soft rate limit may be set high enough to not be noticeable.

Outer loop controller 132 may include circuitry, components, processors, transceivers, or a combination thereof configured to receive and/or send electrical signals. Outer loop controller 132 may include a proportional-integral-derivative (PID) controller. PID controllers may automatically apply accurate and responsive correction to a control function in a loop, such that over time the correction remains responsive to the previous output and actively controls an output. Controller 112 may include damping, including critical damping to attain the desired setpoint, which may be an output to a propulsor in a timely and accurate way. Outer loop controller 132 may include components, circuitry, receivers, transceivers, or a combination thereof. Outer loop controller 132 may be configured to generate rate setpoint 136 as a function of sensor datum 108 and identification of defunct actuator 128. In a non-limiting embodiment, controller 112 may use an outer angle loop driving an inner rate loop to provide closed loop control with setpoints of desired pitch attitude, roll attitude, and yaw rate provided directly by the pilot. The outer (angle) loop provides rate setpoint 136. Rate setpoint 136 may include the desired rate of change of one or more angles describing the aircraft's orientation, heading, and propulsion, or a combination thereof. Rate setpoint 136 may include the pilot's desired rate of change of aircraft pitch angle, consistent with pitch angles, and largely at least an aircraft angle 116 in the entirety of this disclosure. Rate setpoint 136 may include a measurement in a plurality of measurement systems including quaternions or any other measurement system as described herein.

With continued reference to FIG. 1, controller 112 may comprise inner loop controller 140, wherein inner loop controller 140 may be configured to generate moment datum 144 as a function of rate setpoint 136. Moment datum 144 may include any information describing the moment of an aircraft. Moment datum 144 includes information regarding pilot's desire to apply a certain moment or collection of moments on one or more portions of an electric aircraft, including the entirety of the aircraft. For instance and without limitation, inner loop controller may be consistent with inner loop controller in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. Inner loop controller 140 may be implemented in any manner suitable for implementation of outer loop controller. The inner loop of the controller may be composed of a lead-lag filter for roll rate, pitch rate, and yaw rate, and an integrator that acts only on yaw rate. Integrators may be avoided on the roll and pitch rate because they introduce additional phase lag that, coupled with the phase lag inherent to slow lift fans or another type of one or more propulsors, limits performance. Furthermore, it may not be necessary to have good steady state error in roll and pitch rate, which an integrator helps achieve in yaw rate. A final component of the inner loop may include gain scheduling on lift lever input. As previously discussed, the only controller change between low speed flight and fully wing-borne flight may be this gain scheduling. The plot below shows the input to output gain of this function for varying lift lever inputs. At anything above the assisted lift input corresponding to zero airspeed flight, the full requested moment from the inner loop may be sent to the mixer. At assisted lift levels lower than this, the requested moment from the inner loop may be multiplied by a gain that linearly decays to zero as shown in the plot below. The exact shape of this gain reduction may be open to change slightly. Experimentation in simulation has shown that anything between a square root function up to the IGE average torque setting and the linear map shown above works acceptably. Because the moment that can be generated by the control surfaces in pitch may be such a strong function of angle of attack, the relatively small difference in hover moment achieved between the linear and square root maps may be washed out by the angle of attack variation in a transition. At low lift lever input, the plane would have to have significant unpowered lift (and therefore airspeed) to not lose altitude. In this case, the control surface effectivity will be significant, and full moment production from the lift motors will not be necessary. When the lift lever may be all the way down, the lift motors may stop rotation and stow into a low drag orientation. Then, the only control authority comes from the aerodynamic control surfaces, and the plane controlled exclusively via manual pilot inputs. On transition out from vertical to cruise flight, the coordination and scheduling of control may be intuitive and straightforward. In a non-limiting example, during the transition in, or decelerating from an aborted takeoff, it may be important that the pilot not decrease assisted lift below a 15% average torque threshold in order to maintain aircraft control and not develop an unrecoverable sink rate when operating in certain airspeed regimes such as the transition regime. A mechanical detent may be installed in the lift lever, throttle, or any control input, to provide proprioceptive feedback when crossing this threshold which should occur operationally only during the terminal phases of a vertical landing.

With continued reference to FIG. 1, inner loop controller 140 may include a lead-lag-filter. Inner loop controller 140 may include an integrator. The attitude controller gains are scheduled such that full gain authority may be only achieved when the assisted lift lever may be greater than 50% torque, which corresponds to a nominal torque required to support the aircraft without fully developed lift from the wing. At average torque levels lower than said nominal levitation torque, the output of the inner loop (desired moment vector to apply to the vehicle) may be directly scaled down. This decrease in moment generated at the lift rotors may be designed to be directly complementary to the increase in aerodynamic control surface effectivity as the dynamic pressure builds on the flying wing and the flying surfaces. As a result, the total moment applied to the vehicle for a given pilot input may be kept near constant.

With continued reference to FIG. 1, controller 112 may comprise mixer 148, wherein mixer 148 may be configured to generate actuator allocation command datum 152 as a function of moment datum 144. In a non-limiting embodiment, moment datum 144 may include a plurality of attitude commands and allocates one or more outgoing signals, such as modified attitude commands and output torque command, or the like, to at least a propulsor, flight component, or one or more computing devices connected thereto. For instance and without limitation, mixer may be consistent with mixer in U.S. patent application Ser. No. 17/218,428 and titled "METHODS AND SYSTEMS FOR FLIGHT CONTROL CONFIGURED FOR USE IN AN ELECTRIC AIRCRAFT," which is incorporated herein by reference in its entirety. Additionally and alternatively, mixer 148, as used herein, may be described as performing "control allocation" or "torque allocation". For example, mixer may take in commands to alter aircraft trajectory that requires a change in pitch and yaw. Mixer may allocate torque to at least one propulsor (or more) that do not independently alter pitch and yaw in combination to accomplish the command to change pitch and yaw. More than one propulsor may be required to adjust torques to accomplish the command to change pitch and yaw, mixer would take in the command and allocate those torques to the appropriate propulsors consistent with the entirety of this disclosure. One of ordinary skill in the art, after reading the entirety of this disclosure, will appreciate the limitless combination of propulsors, flight components, control surfaces, or combinations thereof that could be used in tandem to generate some amount of authority in pitch, roll, yaw, and lift of an electric aircraft consistent with this disclosure.

With continued reference to FIG. 1, mixer 148 may be configured to solve at least an optimization problem, which may be an objective function. An "objective function," as used in this disclosure, is a mathematical function with a solution set including a plurality of data elements to be compared. Mixer 148 may compute a score, metric, ranking, or the like, associated with each performance prognoses and candidate transfer apparatus and select objectives to minimize and/or maximize the score/rank, depending on whether an optimal result may be represented, respectively, by a minimal and/or maximal score; an objective function may be used by mixer to score each possible pairing. At least an optimization problem may be based on one or more objectives, as described below. Mixer 148 may pair a candidate transfer apparatus, with a given combination of performance prognoses, that optimizes the objective function. In various embodiments solving at least an optimization problem may be based on a combination of one or more factors. Each factor may be assigned a score based on predetermined variables. In some embodiments, the assigned scores may be weighted or unweighted. Solving at least an optimization problem may include performing a greedy algorithm process, where optimization may be performed by minimizing and/or maximizing an output of objective function. A "greedy algorithm" is defined as an algorithm that selects locally optimal choices, which may or may not generate a globally optimal solution. For instance, mixer may select objectives so that scores associated therewith are the best score for each goal. For instance, in non-limiting illustrative example, optimization may determine the pitch moment associated with an output of at least a propulsor based on an input.

Still referring to FIG. 1, at least an optimization problem may be formulated as a linear objective function, which mixer may optimize using a linear program such as without limitation a mixed-integer program. A "linear program," as used in this disclosure, is a program that optimizes a linear objective function, given at least a constraint; a linear program maybe referred to without limitation as a "linear optimization" process and/or algorithm. For instance, in non-limiting illustrative examples, a given constraint might be torque limit, and a linear program may use a linear objective function to calculate maximum output based on the limit. In various embodiments, mixer may determine a set of instructions towards achieving a user's goal that maximizes a total score subject to a constraint that there are other competing objectives. A mathematical solver may be implemented to solve for the set of instructions that maximizes scores; mathematical solver may be implemented on mixer and/or another device in flight control system 100, and/or may be implemented on third-party solver. At least an optimization problem may be formulated as nonlinear least squares optimization process. A "nonlinear least squares optimization process," for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of signals to at least a propulsor. Solving at least an optimization problem may include minimizing a loss function, where a "loss function" is an expression an output of which a ranking process minimizes to generate an optimal result. As a non-limiting example, mixer may assign variables relating to a set of parameters, which may correspond to score components as described above, calculate an output of mathematical expression using the variables, and select an objective that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

With continued reference to FIG. 1, mixer 148 may be configured to generate actuator allocation command datum 152 as a function of the torque allocation. Actuator allocation command datum 152 may include at least a torque vector. Actuator allocation command datum 152 may be represented in any suitable form, which may include, without limitation, vectors, matrices, coefficients, scores, ranks, or other numerical comparators, and the like. A "vector" as defined in this disclosure is a data structure that represents one or more quantitative values and/or measures of forces, torques, signals, commands, or any other data structure as described in the entirety of this disclosure. A vector may be represented as an n-tuple of values, where n is at least two values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and may be distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n} a_i^2}$, where $a_i$ is attribute number i of the vector. Scaling and/or normalization may function to make vector comparison independent of absolute quantities of attributes, while preserving any dependency on similarity of attributes. One of ordinary skill in the art would appreciate a vector to be a mathematical value consisting of a direction and magnitude. A "torque", for the purposes of this disclosure, refers to a twisting force that tends to cause rotation. Torque is the rotational equivalent of linear force. In three dimensions, the torque may be a pseudovector; for point particles, it may be given by the cross product of the position vector (distance vector) and the force vector. The magnitude of torque of a rigid body depends on three quantities: the force applied, the lever arm vector connecting the point about which the torque may be being measured to the point of force application, and the angle between the force and lever arm vectors. A force applied perpendicularly to a lever multiplied by its distance from the lever's fulcrum (the length of the lever arm) may be its torque. A force of three newtons applied two meters from the fulcrum, for example, exerts the same torque as a force of one newton applied six meters from the fulcrum. The direction of the torque can be determined by using the right-hand grip rule: if the fingers of the right hand are curled from the direction of the lever arm to the direction of the force, then the thumb points in the direction of the torque. One of ordinary skill in the art would appreciate that torque may be represented as a vector, consistent with this disclosure, and therefore includes a magnitude of force and a direction. "Torque" and "moment" are equivalents for the purposes of this disclosure. Any torque command or signal herein may include at least the steady state torque to achieve the initial vehicle torque signal 108 output to at least a propulsor.

With continued reference to FIG. 1, as previously disclosed, solving at least an optimization problem may include solving sequential problems relating to vehicle-level inputs to at least a propulsor, namely pitch, roll, yaw, and collective force. Mixer 148 may solve at least an optimization problem in a specific order. According to exemplary embodiments, mixer 148 may solve at least an optimization problem wherein at least an optimization problem includes a pitch moment function. Solving may be performed using a nonlinear program and/or a linear program. Mixer may solve at least an optimization problem wherein solving at least an optimization program may include solving a roll moment function utilizing a nonlinear program to yield the desired amount of roll moment as a function of the desired amount of pitch moment. Mixer 148 may solve at least an optimization problem wherein solving at least an optimization program may include solving a collective force function utilizing a nonlinear program to yield the desired amount of collective force as a function of the desired amount of pitch moment and the desired amount of roll moment. Mixer 148 may solve at least an optimization problem wherein solving at least an optimization program may include solving a yaw moment function utilizing a nonlinear program to yield the desired amount of yaw moment, as a function of the desired amount of pitch moment, the desired amount of roll moment, and the desired amount of collective force. One of ordinary skill in the art, after reading the entirety of this disclosure, will appreciate that any force program may be implemented as a linear or non-linear program, as any linear program may be expressed as a nonlinear program.

With continued reference to FIG. 1, mixer 148 may include one or more computing devices as described herein. Mixer 148 may be a separate component or grouping of components from those described herein. Mixer 148 is configured to generate actuator allocation command datum 152 as a function of the torque allocation. Mixer 148 may be configured to allocate a portion of total possible torque amongst one or more propulsors based on relative priority of a plurality attitude control commands and desired aircraft maneuver. In a non-limiting illustrative example, torque allocation between two attitude control components (e.g., pitch and roll or roll and yaw) may be based on the relative priorities of those two attitude control components. Priority refers to how important to the safety of the aircraft and any users while performing the attitude control component may be relative to the other attitude control commands. Priority may also refer to the relative importance of each attitude control component to accomplish one or more desired aircraft maneuvers. For example, pitch attitude control component may be the highest priority, followed by roll, lift, and yaw attitude control components. In another example, the relative priority of the attitude components may be specific to an environment, aircraft maneuver, mission type, aircraft configuration, or other factors, to name a few. Torque allocator may set the highest priority attitude control component torque allocation as close as possible given the torque limits as described in this disclosure to the original command for the higher-priority attitude control component, in the illustrative example, pitch, then project to the value possible for the lower priority attitude control component, in this case, lift. The higher priority attitude control component in the first torque allocation may be the attitude control component with the highest overall priority. This process may be then repeated with lower priority attitude control component from the above comparison and the next highest down the priority list. In a non-limiting illustrative example, the next two-dimensional torque allocation problem solved would include lift and roll attitude control commands. In embodiments, the lower priority attitude command component has already been set form the previous two-dimensional torque allocation, so this may be projecting the closest possible value for the third-level attitude command (roll in this example). This process would repeat again for the third and fourth attitude components, in this non-limiting example, roll and yaw attitude control components. Since roll may be prioritized over yaw, the roll attitude control command would be preserved, and yaw would be sacrificed as a function of the vehicle torque limits as described herein. After the sequence of two-dimensional attitude control component torque allocation are completed and four prioritized attitude component commands are set, one or more components may send out commands to flight control surfaces/propulsors to generate the set torque values allocated in the foregoing process. As a non-limiting example of one step in the torque allocation process, pitch axis may represent the command or plurality of attitude commands inputted to mixer 148 as described herein, such as moment datum 140. Pitch axis may be conditioned or altered to be inputted to mixer 148. For example, and without limitation, initial vehicle torque signal may include pitch and lift commands within plurality of attitude commands. Mixer 148 may also receive at least a moment datum 140, which may be represented without limitation by a box plotted within the pitch and lift axes. A point where pitch command and lift command intersect may represent initial vehicle torque signal as projected onto exemplary graph of pitch and lift axes, which may be the same or similar to initial vehicle torque signal as disclosed in the entirety of this disclosure. Mixer 148 utilizes prioritization data as described in the entirety of this disclosure to solve this two-dimensional problem by preserving the higher priority command and sacrificing the lower priority command. This prioritization preservation process may be illustrated, as a non-limiting example by placement of a modified attitude command, wherein the pitch command was preserved (horizontally translated and therefore unchanged from the initial command), while the lift command was lessened to bring the modified attitude command within vehicle torque limits (the box). The modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers. The remaining vehicle torque may be displayed to a pilot or user. The above-described may be a non-limiting example of one step in the torque allocation process. Torque allocation process may be similar or the same process as described above with the torque limits adjusted for inertia compensation. Mixer 148 may be disposed fully or partially within mixer any mixer as disclosed herein. Mixer 148 may include one or more computing devices as described herein. Mixer 148 also receives at least a vehicle torque limit represented by an imaginary box plotted within the pitch and lift axes, which may be the same as, or similar to at least a vehicle torque limit. Here instead of the box being made of straight linear sides, the inertia compensation as previously discussed creates curved limits, wherein certain plurality of attitude commands may be allowed whereas without inertia compensation they would be outside of the limits. Where the pitch command and lift command intersect may be the initial vehicle torque signal, which may be the same or similar to initial vehicle torque signal as disclosed in the entirety of this disclosure. Mixer 148 utilizes prioritization data as described in the entirety of this disclosure to solve this two-dimensional problem by preserving the higher priority command and sacrificing the lower priority command. This prioritization preservation process may be shown by the placement of modified attitude command, wherein the pitch command was preserved (horizontally translated and therefore unchanged from the initial command), while the lift command was lessened to bring the modified attitude command within vehicle torque limits (the box). Actuator allocation command datum 152 effectively commands the amount of torque to one or more propulsors to accomplish the closest vehicle level torque to initial vehicle torque signal as possible given certain limits, maneuvers, and aircraft conditions. Modified attitude command, as discussed in the entirety of this disclosure, may be further combined, modified, conditioned, or otherwise adjusted to produce output torque command to the plurality of propulsors. The remaining vehicle torque represents the remaining torque capability in one or more propulsors before, during, and after an aircraft maneuver. The remaining vehicle torque may include an individual propulsor's remaining torque capability, one or more of pitch, roll, yaw, and lift, capabilities of one or more propulsors, the remaining vehicle-level torque or power for subsequent maneuvers.

Figure 2:
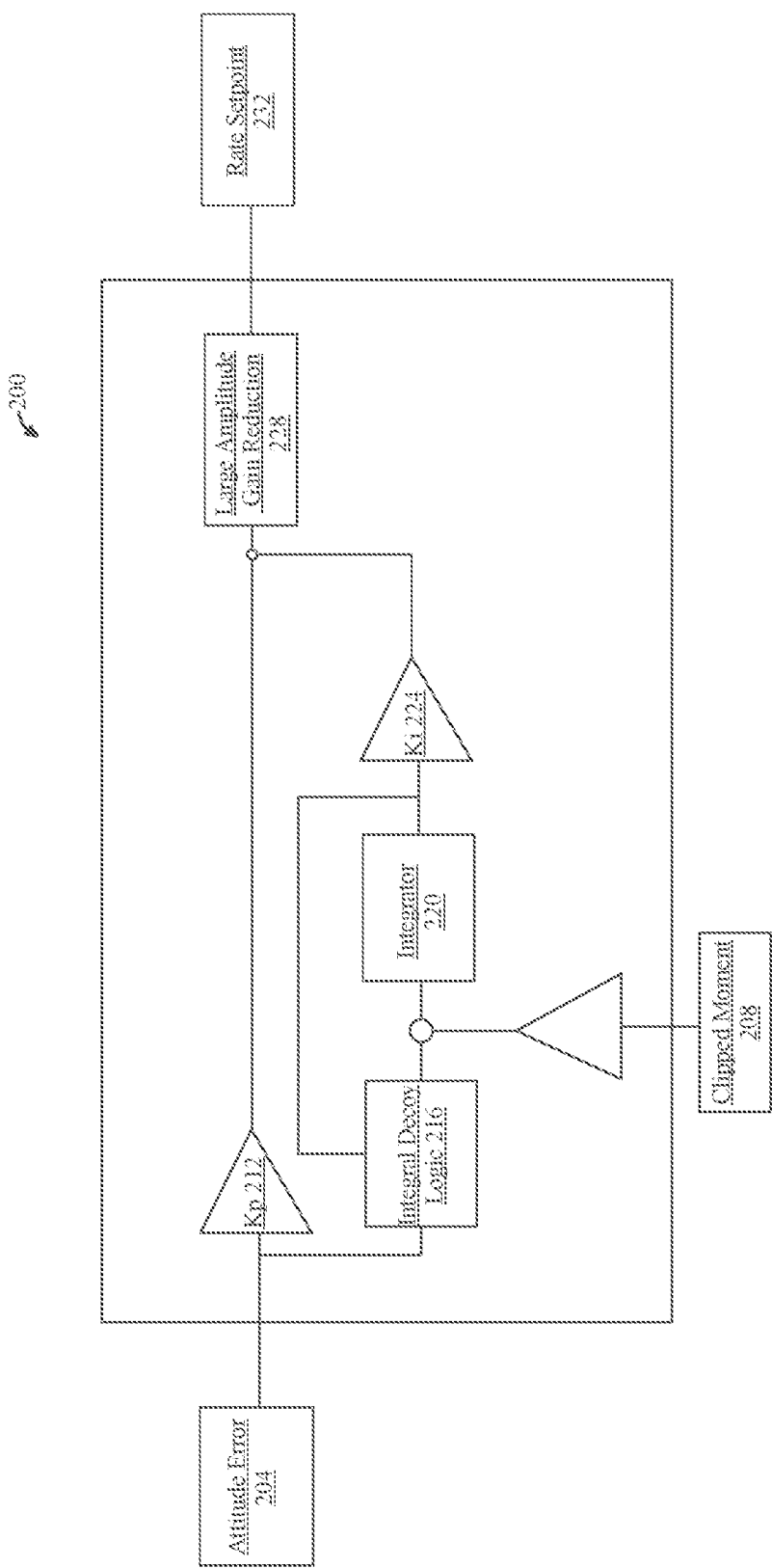
FIG. 2 is an illustrative embodiment of an outer loop controller for use in embodiments of the present invention.

Referring now to FIG. 2, an exemplary embodiment of outer loop controller 200 is presented in block diagram form. Outer loop controller 200 may be consistent with any outer loop controller as described herein. Outer loop controller 200 may include attitude error 204. Attitude error 204 may include a measurement of the difference between the commanded at least an aircraft angle 116 and the actual angle of the aircraft in any of pitch, roll, yaw, or a combination thereof. The attitude error 204 may include a percentage, measurement in degrees, measurement in radians, or one or more representations of a difference in commanded aircraft angle as a function of input datum 104 and actual angle of aircraft in the aforementioned attitudes. Attitude error 204 may include measurements as detected by one or more sensors configured to measure aircraft angle like an IMU, gyroscope, motion sensor, optical sensor, a combination thereof, or another sensor of combination of sensors. Outer loop controller 200 may include clipped moment 208 as an input to controller. Clipped moment 208 may include one or more elements of data that have been selected from a larger sample size or range. Clipped moment 208 may have been selected for its lack of noise, improved efficiency, or accuracy of moment associated with any one or more elements of an electric aircraft consistent with the entirety of this disclosure. Gain may be a linear operation. Gain compression may be not linear and, as such, its effect may be one of distortion, due to the nonlinearity of the transfer characteristic which also causes a loss of 'slope' or 'differential' gain. So, the output may be less than expected using the small signal gain of the amplifier. In clipping, the signal may be abruptly limited to a certain amplitude and may be thereby distorted in keeping under that level. This creates extra harmonics that are not present in the original signal. "Soft" clipping or limiting means there isn't a sharp "knee point" in the transfer characteristic. A sine wave that has been softly clipped will become more like a square wave with more rounded edges, but will still have many extra harmonics. Outer loop controller 200 may include Kp operational amplifier 212. Kp op amp 212 may include one or more constants configured to scale any one or more signals in any control loop or otherwise computing devices for use in controlling aspects of an electric aircraft. Outer loop controller 200 may include integral decoy logic 216. Outer loop controller 200 may include integrator 220. Integrator 220 may include an operational amplifier configured to perform a mathematical operation of integration of a signal; output voltage may be proportional to input voltage integrated over time. An input current may be offset by a negative feedback current flowing in the capacitor, which may be generated by an increase in output voltage of the amplifier. The output voltage may be therefore dependent on the value of input current it has to offset and the inverse of the value of the feedback capacitor. The greater the capacitor value, the less output voltage has to be generated to produce a particular feedback current flow. The input impedance of the circuit may be almost zero because of the Miller effect. Hence all the stray capacitances (the cable capacitance, the amplifier input capacitance, etc.) are virtually grounded and they have no influence on the output signal. Operational amplifier as used in integrator may be used as part of a positive or negative feedback amplifier or as an adder or subtractor type circuit using just pure resistances in both the input and the feedback loop. As its name implies, the Op-amp Integrator is an operational amplifier circuit that causes the output to respond to changes in the input voltage over time as the op-amp produces an output voltage which may be proportional to the integral of the input voltage. In other words, the magnitude of the output signal may be determined by the length of time a voltage may be present at its input as the current through the feedback loop charges or discharges the capacitor as the required negative feedback occurs through the capacitor. Input voltage may be Vin and represent the input signal to controller such as one or more of sensor datum 108 and/or attitude error 204. Output voltage Vout may represent output voltage such as one or more outputs like rate setpoint 232. When a step voltage, Vin may be firstly applied to the input of an integrating amplifier, the uncharged capacitor C has very little resistance and acts a bit like a short circuit allowing maximum current to flow via the input resistor, Rin as potential difference exists between the two plates. No current flows into the amplifiers input and point X may be a virtual earth resulting in zero output. As the impedance of the capacitor at this point may be very low, the gain ratio of $X_C/R_{IN}$ may be also very small giving an overall voltage gain of less than one, (voltage follower circuit). As the feedback capacitor, C begins to charge up due to the influence of the input voltage, its impedance Xc slowly increase in proportion to its rate of charge. The capacitor charges up at a rate determined by the RC time constant, ($\tau$) of the series RC network. Negative feedback forces the op-amp to produce an output voltage that maintains a virtual earth at the op-amp's inverting input. Since the capacitor may be connected between the op-amp's inverting input (which may be at virtual ground potential) and the op-amp's output (which may be now negative), the potential voltage, Vc developed across the capacitor slowly increases causing the charging current to decrease as the impedance of the capacitor increases. This results in the ratio of Xc/Rin increasing producing a linearly increasing ramp output voltage that continues to increase until the capacitor may be fully charged. At this point the capacitor acts as an open circuit, blocking any more flow of DC current. The ratio of feedback capacitor to input resistor ($X_C/R_{IN}$) may be now infinite resulting in infinite gain. The result of this high gain (similar to the op-amps open-loop gain), may be that the output of the amplifier goes into saturation as shown below. (Saturation occurs when the output voltage of the amplifier swings heavily to one voltage supply rail or the other with little or no control in between). The rate at which the output voltage increases (the rate of change) may be determined by the value of the resistor and the capacitor, "RC time constant". By changing this RC time constant value, either by changing the value of the Capacitor, C or the Resistor, R, the time in which it takes the output voltage to reach saturation can also be changed for example. Outer loop controller 200 may include a double integrator, consistent with the description of an integrator with the entirety of this disclosure. Single or double integrators consistent with the entirety of this disclosure may include analog or digital circuit components. Outer loop controller 200 may include Ki operational amplifier 224. Ki op amp 224 may be a unique constant configured to scale any one or more signals or data as described herein with reference to kp op amp 212. Outer loop controller 200 may include large amplitude gain reduction 228. Large amplitude gain reduction 228 may be configured to reduce gain on large amplitude input signals consistent with the above description. Compression of gain may be caused by non-linear characteristics of the device when run at large amplitudes. With any signal, as the input level may be increased beyond the linear range of the amplifier, gain compression will occur. A transistor's operating point may move with temperature, so higher power output may lead to compression due to collector dissipation. But it may be not a change in gain; it may be non-linear distortion. The output level stays relatively the same as the input level goes higher. Once the non-linear portion of the transfer characteristic of any amplifier may be reached, any increase in input will not be matched by a proportional increase in output. Thus, there may be compression of gain. Also, at this time because the transfer function may be no longer linear, harmonic distortion will result. In intentional compression (sometimes called automatic gain control or audio level compression as used in devices called 'dynamic range compressors', the overall gain of the circuit may be actively changed in response to the level of the input over time, so the transfer function remains linear over a short period of time. A sine wave into such a system will still look like a sine wave at the output, but the overall gain may be varied, depending on the level of that sine wave. Above a certain input level, the output sine wave will always be the same amplitude. The output level of Intentional compression varies over time, in order to minimize non-linear behavior. With gain compression, the opposite may be true, its output may be constant. In this respect intentional compression serves less of an artistic purpose.

Figure 3:
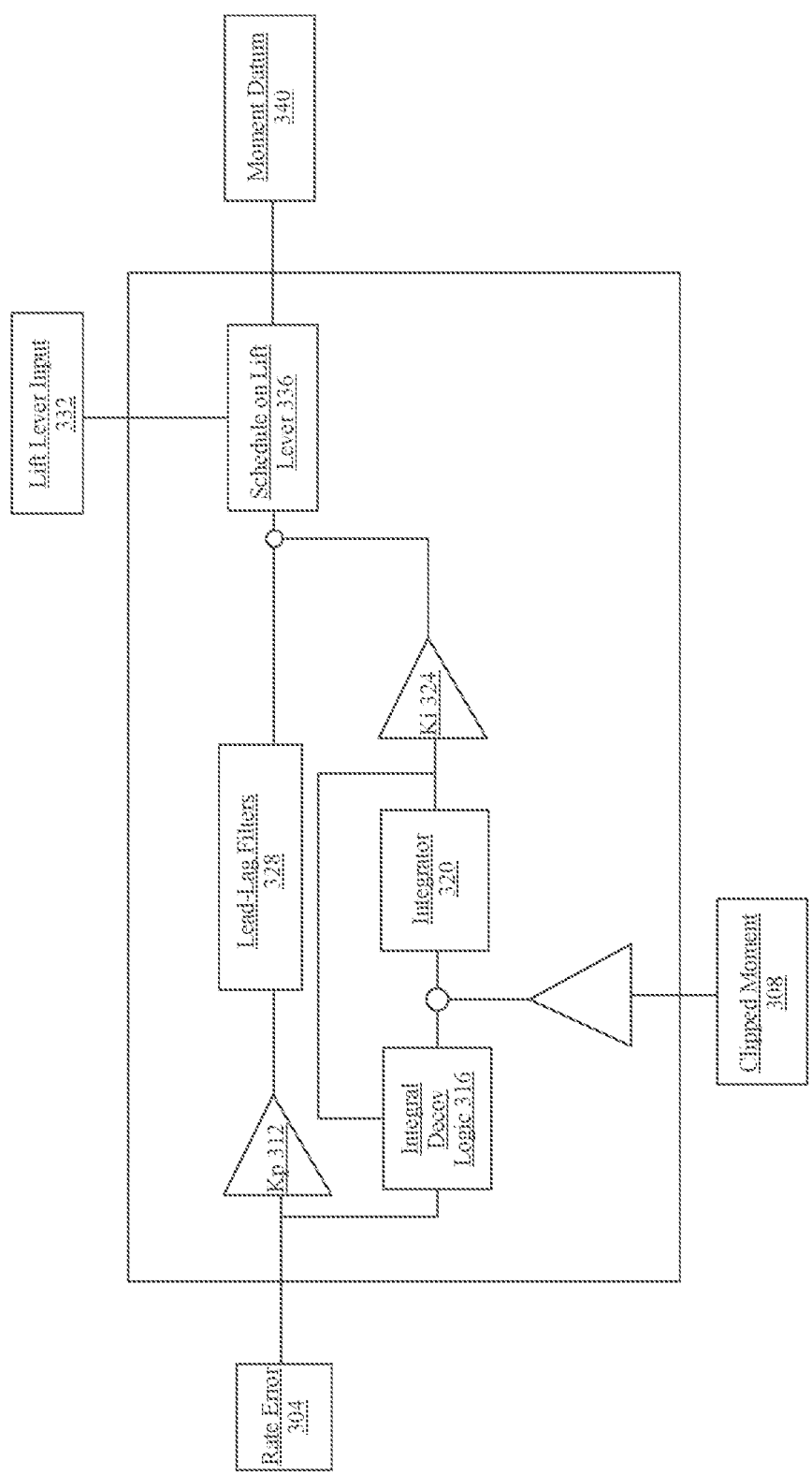
FIG. 3 is an illustrative embodiment of an inner loop controller for use in embodiments of the present invention.

Referring now to FIG. 3, an exemplary embodiment of inner loop controller 300 is presented in block diagram form. Inner loop controller 300 may include clipped moment 308 as an input to controller. Gain may be a linear operation. Gain compression may be not linear and, as such, its effect may be one of distortion, due to the nonlinearity of the transfer characteristic which also causes a loss of 'slope' or 'differential' gain. So, the output may be less than expected using the small signal gain of the amplifier. In clipping, the signal may be abruptly limited to a certain amplitude and may be thereby distorted in keeping under that level. This creates extra harmonics that are not present in the original signal. "Soft" clipping or limiting means there isn't a sharp "knee point" in the transfer characteristic. A sine wave that has been softly clipped will become more like a square wave with more rounded edges but will still have many extra harmonics. Inner loop controller 300 may include Kp operational amplifier 312. Inner loop controller 300 may include integral decoy logic 316. Inner loop controller 300 may include integrator 320. Integrator 320 may include an operational amplifier configured to perform a mathematical operation of integration of a signal; output voltage may be proportional to input voltage integrated over time. An input current may be offset by a negative feedback current flowing in the capacitor, which may be generated by an increase in output voltage of the amplifier. The output voltage may be therefore dependent on the value of input current it has to offset and the inverse of the value of the feedback capacitor. The greater the capacitor value, the less output voltage has to be generated to produce a particular feedback current flow. The input impedance of the circuit almost zero because of the Miller effect. Hence all the stray capacitances (the cable capacitance, the amplifier input capacitance, etc.) are virtually grounded and they have no influence on the output signal. Operational amplifier as used in integrator may be used as part of a positive or negative feedback amplifier or as an adder or subtractor type circuit using just pure resistances in both the input and the feedback loop. As its name implies, the Op-amp Integrator is an operational amplifier circuit that causes the output to respond to changes in the input voltage over time as the op-amp produces an output voltage which may be proportional to the integral of the input voltage. In other words, the magnitude of the output signal may be determined by the length of time a voltage may be present at its input as the current through the feedback loop charges or discharges the capacitor as the required negative feedback occurs through the capacitor. Input voltage may be Vin and represent the input signal to controller such as one or more of sensor datum 108 and/or attitude error 304. Output voltage Vout may represent output voltage such as one or more outputs like rate setpoint 332. When a step voltage, yin may be firstly applied to the input of an integrating amplifier, the uncharged capacitor C has very little resistance and acts a bit like a short circuit allowing maximum current to flow via the input resistor, Rin as potential difference exists between the two plates. No current flows into the amplifiers input and point X may be a virtual earth resulting in zero output. As the impedance of the capacitor at this point may be very low, the gain ratio of $X_C/R_{IN}$ may be also very small giving an overall voltage gain of less than one, (voltage follower circuit). As the feedback capacitor, C begins to charge up due to the influence of the input voltage, its impedance Xc slowly increase in proportion to its rate of charge. The capacitor charges up at a rate determined by the RC time constant, ($\tau$) of the series RC network. Negative feedback forces the op-amp to produce an output voltage that maintains a virtual earth at the op-amp's inverting input. Since the capacitor may be connected between the op-amp's inverting input (which may be at virtual ground potential) and the op-amp's output (which may be now negative), the potential voltage, Vc developed across the capacitor slowly increases causing the charging current to decrease as the impedance of the capacitor increases. This results in the ratio of Xc/Rin increasing producing a linearly increasing ramp output voltage that continues to increase until the capacitor may be fully charged. At this point the capacitor acts as an open circuit, blocking any more flow of DC current. The ratio of feedback capacitor to input resistor ($X_C/R_{IN}$) may be now infinite resulting in infinite gain. The result of this high gain, similar to the op-amps open-loop gain, may be that the output of the amplifier goes into saturation as shown below. (Saturation occurs when the output voltage of the amplifier swings heavily to one voltage supply rail or the other with little or no control in between). The rate at which the output voltage increases (the rate of change) may be determined by the value of the resistor and the capacitor, "RC time constant". By changing this RC time constant value, either by changing the value of the Capacitor, C or the Resistor, R, the time in which it takes the output voltage to reach saturation can also be changed for example. Inner loop controller 300 may include a double integrator, consistent with the description of an integrator with the entirety of this disclosure. Single or double integrators consistent with the entirety of this disclosure may include analog or digital circuit components. Inner loop controller 300 may include Ki operational amplifier 324. Inner loop controller 300 may include lead-lag filters 328 consistent with the description of lead-lag filters herein below. Inner loop controller 300 may include lift lever input 332 as described herein below. Inner loop controller 300 may include Schedule on lift lever 236 as described herein below.

Inner loop controller 300 may include pitch rate damping. Adding pitch rate damping with the elevators may be the least intrusive form of augmentation that has been suggested. In this scheme, the elevator input may be a sum of the pilot input (as in fully manual flight) and a component that arrests pitch rate as measured by the IMU's such as IMU 112. The scheduling on the lift lever may be such that in forward flight (with 0 assisted lift), the full damping may be active. As the lift lever rises above some value (set to 0.1), the damping rolls off so that very low airspeed behavior may be handled entirely by the attitude controller. The higher this value may be set, the more active the elevator damping will be at low-speed flight (i.e., flight with substantial assisted lift). The saturation on the damping term ensures that the pilot has some amount of control authority regardless of what the augmentation attempts to do. With this design, as with the baseline design, there may be no blending between modes required during acceleration from lift assisted flight to fully wing-borne flight. Additionally, there may be no control discontinuity as the lift fans turn off and stow.

With continued reference to FIG. 3, an alternative augmentation strategy may be to close a pitch rate loop with the control surfaces. If one chooses to use this, note that in order to avoid blending between control modes while accelerating from low-speed flight to wing-borne flight, the control system commanding the lift rotors must also be RCRH (as opposed to the nominal ACAH). An RCRH low airspeed controller potentially increases pilot workload substantially. Also note that the gains appropriate for this controller change substantially across an electric aircraft's range of cruise airspeeds (as elevator effectivity changes with dynamic pressure). Since the lift lever will be all the way down during cruise, lift lever can no longer use this signal as a proxy for airspeed. Since using airspeed as an input would introduce an additional low reliability system, the system would be forced to select constant gains that produce a stable system at all reasonable airspeeds. The resulting system would have poor performance at low airspeeds. It may be possible to approximate airspeed in cruise from knowledge of the pusher performance and the operating speed and torque. Such an estimate of airspeed would likely be sufficient to enable the scheduling of gains on airspeed, which would result in less conservative design, and higher performance. For the purposes of controlling a vehicle, controller 112 are interested in the aerodynamic forces that the lift rotors can provide. However, since the aerodynamic forces and torques that the rotors generate are a function of speed, and the lift rotors have substantial inertia, simply passing the corresponding steady state torque commands to the motor will result in a slow thrust response. If this substantial phase lag may be not compensated for, performance will be severely limited. Because controller 112 have a good understanding of the physics involved, controller 112 can apply a dynamic inverse of the rotor model to the steady state torque signals in order to obtain better speed tracking, and therefore better thrust tracking. Intuitively, this dynamic inverse adds a "kick" forward when the incoming signal increases sharply and adds a "kick" backwards when the incoming signal decreases sharply. Once the car may be at speed, one likely only needs one quarter throttle to maintain speed, which suggests that holding one quarter throttle for a sufficiently long time starting from a low speed would eventually accelerate the car to the desired speed. Of course, if one uses full throttle to get up to speed, and then returns to quarter throttle to hold speed, a faster response can be achieved. This may be the core idea of what the dynamic inverse does. To apply a dynamic inverse, controller 112 first generate a model based on Euler's equation in 1 dimension. Here, I may be the fan inertia about the axis of rotation, omega may be the angular velocity of the motor, $\tau_{motor}$ may be the shaft torque generated by the motor, and $\tau_{aero}$ may be the aerodynamic shaft torque. Because the aerodynamic term may be nonlinear in the speed state, controller 112 will omit this from the dynamic inversion for simplicity and handle it separately. Eventually, the torque command that controller 112 send to the motor will be a sum of a softened dynamic inverse of the motor inertia, and an approximation of the aerodynamic torque as below. First, controller 112 will determine the value of the inertia dynamic inverse term. When controller 112 inverts the inertia-only model (i.e. obtain the output→input response rather than the input→output response), controller 112 will end up with a pure derivative, which has an infinite high frequency response, and may be thus not desirable. However, if controller 112 passed a desired speed through this transfer function (given below), the resulting torque output would perfectly reproduce the desired speed.

To make this work on a real system with torque limits, controller 112 will add a first order low pass filter in series with the dynamic inverse sI. If the motors had unlimited torque capability, the resulting dynamics from input to motor speed would be just the low pass dynamics. Note that a motor speed command may be present in this expression. However, controller 112 would like to avoid closing a speed loop on the lift motors. The decision to not close a speed loop was made on the belief that the thrust-torque relationship was more constant than the thrust-speed relationship for edgewise flight. This may be not the case; both relationships vary similarly with edgewise airspeed according to DUST simulations. This decision may be re-evaluated in the future. However, because speed may be the only state of the system, controller 112 may be forced to generate some speed as input to this filter. Note that this speed does not have to be particularly accurate—there are no loops being closed on it, and this dynamic inverse decays to 0 quickly after the input signal stops changing. An appropriate means to generate this pseudo-reference speed may be to use the well-known approximation for the static speed-torque relationship for a fan: Using this relationship, controller 112 can compute the approximate steady state speed that corresponds to a given torque input. Then, this speed signal may be passed through the dynamic inverse of the inertia only system. If this was the only torque that was applied to the lift motors in a vacuum (i.e., no aero drag), the lift rotors would track speeds reasonably well. Of course, this may be not the case, and controller 112 must still account for the aerodynamic torque. If controller 112 could always apply the exact aerodynamic torque experienced by the fan (but in the opposite sense) with the motor, any additional input would "see" only the inertia of the fan and motor. If this additional input may be the inertia-only dynamic inverse, then controller 112 would obtain the desired first order low pass response in speed. Consider the following non-limiting example of bootstrapping. If controller 112 assumes that controller 112 has a good approximation of aerodynamic torque and motor saturation does not engage, then the motor speed response (and therefore the aero torque, approximately) will be a first order low pass filter, with time constant $\tau_{ff}$. This tells us that controller 112 can approximate the aerodynamic torque by passing the steady state torque command through a similar first order transfer function. The combination of this filtered steady state torque and dynamic inversion of the approximated corresponding speed may be shown below. To implement this in discrete time, the transfer functions are discretized using the Tustin, or Bilinear transform. Setting $\tau_{ff}$ and $\tau_{fwd}$ involves simulation of the system subject to different size and direction of input changes about different operating points. These time constants are tweaked to make the fans spin up as quickly as possible over a range of inputs. Intuitively, an excessively large time constant results in a slow response. However, a very short time constant also results in a slow response. With a very short time constant, the amplitude of the initial kick from the dynamic inverse may be very large, but also very short in duration. As a result of motor saturation, the total achieved energy increase from the kick may be low. An intermediate value of time constant (set to approximately 0.13) provides a faster response than either extreme. Due to the nature of the dynamic inverse, this system amplifies noise in the steady state torque command. To avoid this becoming a nuisance while the aircraft may be grounded, the dynamic inverse term may be scheduled on the position of the lift lever in the same way as the inner loop gains, but with a lower threshold. That may be, for 0 lift lever input, there may be 0 dynamic inversion contribution. This contribution ramps up linearly to full at 5% lift lever input. This inertia compensation (or something functionally similar), which may be essentially a lead-lag filter, but with physically derived pole and zero locations, may be essential to the high-performance operation of any vehicle with slow control actuators. Without this, the phase lag introduced by the actuators makes it impossible to achieve bandwidth sufficient for satisfactory handling qualities. For well-flown transitions, the lift lever position may be a good proxy for airspeed, which directly determines the effectiveness of the conventional control surfaces. This follows from the fact that at a fixed angle of attack, dynamic pressure on the wing and unpowered lift are linearly related. Therefore, in order to maintain altitude (which a pilot would tend to do), one would need to lower the lift lever as airspeed increases. In the case that a pilot were to rapidly pull up on the lift lever not in accordance with a decrease in airspeed, a pilot's control inputs would produce more than nominal control moment on the vehicle due to lift fan gains not being scheduled down and high dynamic pressure. In simulation, this scenario has been shown to be non-catastrophic, although it will likely be somewhat violent as the vehicle accelerates upwards rapidly and experiences some attitude transients. It may be easy to understand that each motor can only output a torque between some lower limit and some upper limit. If controller 112 draw the area that corresponds to these available motor commands for the 2-fan system, controller 112 find that a "box" may be formed. If controller 112 assume a linear torque-thrust relationship, then so long as the motors do not rotate on the body, the map from this acceptable box in the motor torque space to the acceptable box in the space where the axes are vehicle level upward thrust and torque may be linear. Therefore, the shape can only be scaled, flipped, and rotated, but straight edges remain straight, and the number of vertices cannot change. With this transformation done, controller 112 can now readily determine if a particular commanded force and torque combination may be possible to achieve. Suppose that controller 112 chooses to prioritize vehicle level torque over force. In the case that the force and torque combination may be inside the box, no saturation occurs—the mixer may be able to achieve the request, and no prioritization may be needed. Suppose instead that some points with the desired torque are within the box, but none of these points have the desired force. Algorithmically, controller 112 first get the achieved torque to match the desired torque as closely as possible. Then, that value may be locked down, and then subject to that constraint, controller 112 matches the desired thrust as closely as possible. In this case, the desired torque is achieved, but the desired thrust is not. Mathematically, this is two sequentially solved linear programs (linear objective, linear constraints). Because controller 112 knew the map from motor torques to vehicle torques, and because that map is invertible, controller 112 can now apply the inverse of this map to get a motor torque command 148 from the point controller 112 identified in the vehicle torque space. Since the point is inside the box in the vehicle torque space, it is guaranteed to also be inside the box in the motor torque vector space, and thus guarantees that the resulting torque commands will be within the limits of the motors. Note that controller 112 have not only resolved the motor saturation, controller 112 also know how much force and torque controller 112 are trying to produce (i.e. Controller 112 haven't blindly done some clipping/rescaling of the motor signals). While this example uses only two dimensions, the principle may be the same in higher dimensions. The solution method used may be slightly different than what may be shown here, but the concept may be the same. Finally, it is important to note that throughout this process, controller 112 has assumed that torque corresponds to thrust. This may be only true in the case of steady state operation. Because the lift fans or one or other propulsors take a substantial amount of time to spin up, this assumption may be not necessarily accurate. As a result, the mixer's estimate of achieved moment may be not accurate for rapidly changing inputs without inertia compensation. Controller 112 can use a behavioral model of the lift fans or speed feedback to better approximate the true moment acting on the aircraft due to powered lift.

Figure 4:
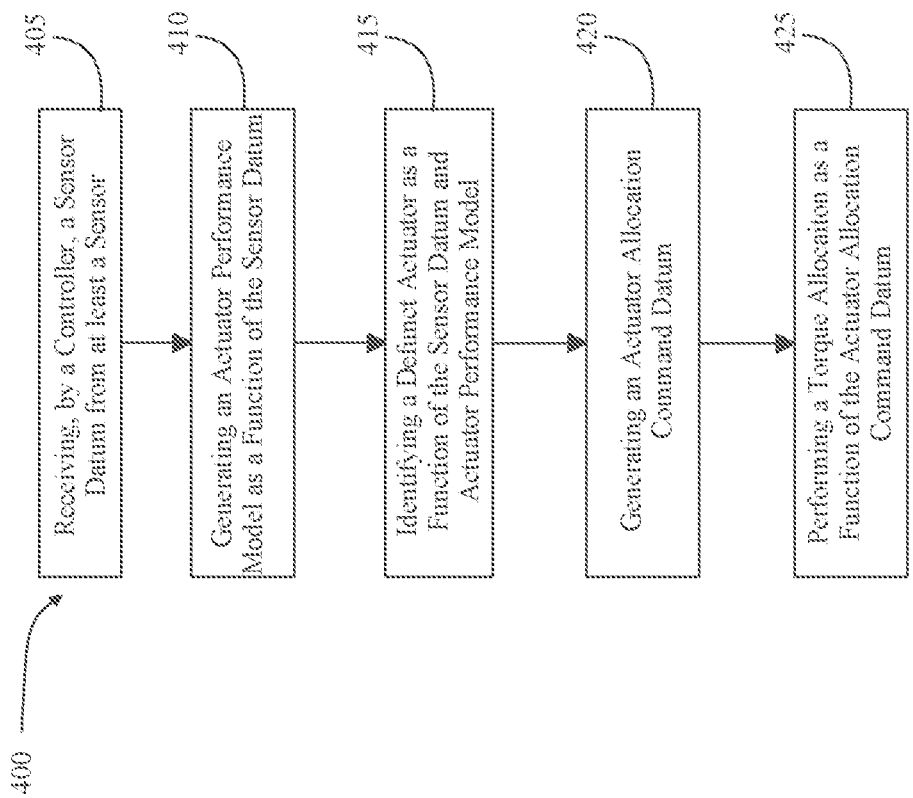
FIG. 4 is a flow diagram of an exemplary method for flight control for managing actuators for an electric aircraft.

Referring now to FIG. 4, flow diagram of an exemplary method 400 for flight control for managing actuators for an electric aircraft is provided. Method 400, at step 405, includes receiving, by a controller, a sensor datum from at least a sensor. Sensor datum may include any sensor datum as described herein. Controller may include any controller as described herein. In a non-limiting embodiment, sensor datum may include any data captured by any sensor as described in the entirety of this disclosure. Additionally and alternatively, sensor datum may include any element or signal of data that represents an electric aircraft route and various environmental or outside parameters. In a non-limiting embodiment, sensor datum may include an element of that representing the safest, most efficient, shortest, or a combination thereof, flight path. In a non-limiting embodiment, sensor datum may include a degree of torque that may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 4, step 405 may include receiving an input datum. At least pilot control may be communicatively connected to any other component presented in system, the communicative connection may include redundant connections configured to safeguard against single-point failure. Pilot input may indicate a pilot's desire to change the heading or trim of an electric aircraft. Pilot input may indicate a pilot's desire to change an aircraft's pitch, roll, yaw, or throttle. Aircraft trajectory is manipulated by one or more control surfaces and propulsors working alone or in tandem consistent with the entirety of this disclosure, hereinbelow. Pitch, roll, and yaw may be used to describe an aircraft's attitude and/or heading, as they correspond to three separate and distinct axes about which the aircraft may rotate with an applied moment, torque, and/or other force applied to at least a portion of an aircraft. Sensor datum may include a flight datum. In a non-limiting embodiment, flight datum may include a plurality of data describing the health status of an actuator of a plurality of actuators. In a non-limiting embodiment, the plurality of data may include a plurality of failure data for a plurality of actuators. In a non-limiting embodiment, safety datum may include a measured torque parameter that may include the remaining vehicle torque of a flight component among a plurality of flight components. Remaining vehicle torque may include torque available at each of a plurality of flight components at any point during an aircraft's entire flight envelope, such as before, during, or after a maneuver. For example, and without limitation, torque output may indicate torque a flight component must output to accomplish a maneuver; remaining vehicle torque may then be calculated based on one or more of flight component limits, vehicle torque limits, environmental limits, or a combination thereof. Vehicle torque limit may include one or more elements of data representing maxima, minima, or other limits on vehicle torques, forces, attitudes, rates of change, or a combination thereof. Vehicle torque limit may include individual limits on one or more flight components, structural stress or strain, energy consumption limits, or a combination thereof. Remaining vehicle torque may be represented, as a non-limiting example, as a total torque available at an aircraft level, such as the remaining torque available in any plane of motion or attitude component such as pitch torque, roll torque, yaw torque, and/or lift torque. In a non-limiting embodiment, controller 112 may mix, refine, adjust, redirect, combine, separate, or perform other types of signal operations to translate pilot desired trajectory into aircraft maneuvers. In a nonlimiting embodiment a pilot may send a pilot input at a press of a button to capture current states of the outside environment and subsystems of the electric aircraft to be displayed onto an output device in pilot view. The captured current state may further display a new focal point based on that captured current state. In a non-limiting embodiment, controller 112 may condition signals such that they can be sent and received by various components throughout the electric vehicle. In a non-limiting embodiment, flight datum may include at least an aircraft angle. At least an aircraft angle may include any information about the orientation of the aircraft in three-dimensional space such as pitch angle, roll angle, yaw angle, or some combination thereof. In non-limiting examples, at least an aircraft angle may use one or more notations or angular measurement systems like polar coordinates, cartesian coordinates, cylindrical coordinates, spherical coordinates, homogenous coordinates, relativistic coordinates, or a combination thereof, among others. In a non-limiting embodiment, flight datum may include at least an aircraft angle rate. At least an aircraft angle rate may include any information about the rate of change of any angle associated with an electrical aircraft as described herein. Any measurement system may be used in the description of at least an aircraft angle rate.

With continued reference to FIG. 4, receiving sensor datum may include receiving from sensor in which a controller and/or sensor may include a plurality of physical controller area network buses communicatively connected to the aircraft and sensor 104. A "physical controller area network bus," as used in this disclosure, is vehicle bus unit including a central processing unit (CPU), a CAN controller, and a transceiver designed to allow devices to communicate with each other's applications without the need of a host computer which is located physically at the aircraft. Physical controller area network (CAN) bus unit may include physical circuit elements that may use, for instance and without limitation, twisted pair, digital circuit elements/FGPA, microcontroller, or the like to perform, without limitation, processing and/or signal transmission processes and/or tasks. In a non-limiting embodiment, the controller may receive the sensor datum from the sensor by a physical CAN bus unit. In a non-limiting embodiment, the sensor 104 may include a physical CAN bus unit to detect sensor datum 108 in tandem with a plurality of individual sensors from a sensor suite. Physical CAN bus unit may include multiplex electrical wiring for transmission of multiplexed signaling. Physical CAN bus unit 104 may include message-based protocol(s), wherein the invoking program sends a message to a process and relies on that process and its supporting infrastructure to then select and run appropriate programing. A plurality of physical CAN bus units may be located physically at the aircraft may include mechanical connection to the aircraft, wherein the hardware of the physical CAN bus unit is integrated within the infrastructure of the aircraft.

With continued reference to FIG. 4, step 405 may include mapping the pilot inputs such as input datum, attitude such as at least an aircraft angle, and body angular rate measurement such as at least an aircraft angle rate to motor torque levels necessary to meet the input datum. In a non-limiting exemplary embodiment, controller may include the nominal attitude command (ACAH) configuration, the controller may make the vehicle attitude track the pilot attitude while also applying the pilot-commanded amount of assisted lift and pusher torque which may be encapsulated within actuator allocation command datum. The flight controller is responsible only for mapping the pilot inputs, attitude, and body angular rate measurements to motor torque levels necessary to meet the input datum. In the nominal attitude command (ACAH) configuration, controller makes the vehicle attitude track the pilot attitude while also applying the pilot commanded amount of assisted lift and pusher torque. In a non-limiting embodiment, controller may include the calculation and control of avionics display of critical envelope information i.e., stall warning, vortex ring state, pitch limit indicator, angle of attack, transition envelopes, etc. In a non-limiting embodiment, controller may calculate, command, and control trim assist, turn coordination, pitch to certain gravitational forces, automation integration: attitude, position hold, LNAV, VNAV etc., minimum hover thrust protection, angle of attack limits, etc., precision Autoland, other aspects of autopilot operations, advanced perception of obstacles for 'see and avoid' missions, and remote operations, among others.

Still referring to FIG. 4, method 400, at step 410, includes generating an actuator performance model as a function of the sensor datum. In a non-limiting embodiment, actuator performance model may include a model depicting the performance of the aircraft in which one or more of the actuators are malfunctioning or failing. In a non-limiting embodiment, actuator performance model may be generated during a flight or after a flight has occurred. For example and without limitation, actuator performance model may depict the performance of the aircraft and the aircraft actuators in real time as it is flying in the air. In a non-limiting embodiment, actuator performance model may include a depiction of the flight of the aircraft. In a non-limiting embodiment, actuator performance model may include a plurality of performance parameters include, but not limited to, aircraft velocity, attitude, actuator torque output, and the like thereof. In a non-limiting embodiment, actuator performance model may highlight an abnormality of an actuator and a plurality of performance parameters associated with that abnormal actuator. Persons skilled in the art, upon reviewing the entirety of this disclosure, will be aware of the various embodiments of a simulation and/or model in the context of visualization and analysis consistent with this disclosure.

With continued reference to FIG. 4, step 410 may include a flight simulator to generate actuator performance model. In some cases, flight simulator may simulate flight within an environment, for example an environmental atmosphere in which aircraft fly, airports at which aircraft take-off and land, and/or mountains and other hazards aircraft attempt to avoid crashing into. In some cases, an environment may include geographical, atmospheric, and/or biological features. In some cases, flight simulator 116 may model an artificial and/or virtual aircraft in flight as well as an environment in which the artificial and/or virtual aircraft flies. In some cases, flight simulator may include one or more physics models, which represent analytically or through data-based, such as without limitation machine-learning processes, physical phenomenon. Physical phenomenon may be associated with an aircraft and/or an environment. For example, some versions of flight simulator may include thermal models representing aircraft components by way of thermal modeling. Thermal modeling techniques may, in some cases, include analytical representation of one or more of convective hear transfer (for example by way of Newton's Law of Cooling), conductive heat transfer (for example by way of Fourier conduction), radiative heat transfer, and/or advective heat transfer. In some cases, flight simulator may include models representing fluid dynamics. For example, in some embodiments, flight simulator may include a representation of turbulence, wind shear, air density, cloud, precipitation, and the like. In some embodiments, flight simulator may include at least a model representing optical phenomenon. For example, flight simulator may include optical models representative of transmission, reflectance, occlusion, absorption, attenuation, and scatter. Flight simulator may include non-analytical modeling methods; for example, the flight simulator may include, without limitation, a Monte Carlo model for simulating optical scatter within a turbid medium, for example clouds. In some embodiments, flight simulator may represent Newtonian physics, for example motion, pressures, forces, moments, and the like. An exemplary flight simulator may include Microsoft Flight Simulator from Microsoft of Redmond, Wash., U.S.A.

With continued reference to FIG. 4, method 400, at step 410, may include generating an expected actuator performance model as a function of the flight simulator. In a non-limiting embodiment, expected actuator performance model may include an actuator performance model that depicts a performance model in which none of the actuators are malfunctioning. For example and without limitation, expected actuator performance model may be a model depicting a performance of what the aircraft should be based on the ideal, expected, or initial performance the aircraft actuators are intended to perform. For example and without limitation, expected actuator performance model includes peak performance output including, but not limited to, power consumption, maximum torque output, cruising torque output, maximum attitude, cruising attitude, maximum velocity, cruising velocity, and the like thereof. For example and without limitation, expected actuator performance model may highlight individual performance parameters of each actuator based on a sensor disposed on each actuator. In a non-limiting embodiment, expected actuator performance model can be used to assess the performance of the aircraft actuators by comparing expected actuator performance model to actuator performance model and analyzing the difference between the data from the two models. In a non-limiting embodiment, controller may feed flight simulator the ideal and/or peak performance parameters of an aircraft and its actuators to simulate expected actuator performance model based on those ideal and/or peak performance parameters. In a non-limiting embodiment, expected actuator performance model may include a plurality of expected actuator performance model depicting a different failure modes of an aircraft and/or an aircraft's actuators. For example and without limitation, a rotor may fail by outputting max thrust, outputting zero thrust, or be stuck at an intermediate setting. In some embodiments, models are determined based on and/or for various actuator settings. In various embodiments, only highly likely or relatively dangerous actuator failure modes are considered and modeled. For example, a rotor may be modeled for a zero-output case but not for a pinned high case. Persons skilled in the art, upon reviewing the entirety of this disclosure, will be aware of the various models and comparisons consistent with this disclosure.

Still referring to FIG. 4, method 400, at step 415, includes identifying a defunct actuator of the electric aircraft as a function of the sensor datum and the actuator performance model. In a non-limiting embodiment, defunct actuator may include any actuator that may produce abnormal outputs. For example and without limitation, defunct actuator may output a torque of 1.5 Newton-metre (Nm) while the remaining actuators may output a torque of 3.6 Nm. In a non-limiting embodiment, actuators may include different failure modes which are represented by various expected actuator performance model. For example, a rotor may fail by outputting max thrust, outputting zero thrust, or be stuck at an intermediate setting. In some embodiments, models are determined based on and/or for various actuator settings. In various embodiments, only highly likely or relatively dangerous actuator failure modes are considered and modeled. For example, a rotor may be modeled for a zero-output case but not for a pinned high case.

With continued reference to FIG. 4, method 400, at step 415, may include comparing actuator performance model to expected actuator performance model to identify defunct actuator. For example and without limitation, controller may sort models based on their expected metrics and select the model that has expected metrics that closely match actual or observed metrics. In one example, the metrics compared include attitude and rates of change in attitude of the aircraft. In some embodiments, controller may compares observed metrics of the aircraft to expected metrics of the aircraft in an operable mode (e.g. no actuator failures associated with a "no failure" model). In a non-limiting embodiment, controller may receive from flight simulator 116, a plurality of expected actuator performance model which may include a model for every possible failure mode. For example and without limitation, in an aircraft comprising four rotors, a model is determined for a first rotor failure, a second rotor failure, a third rotor failure, a fourth rotor failure, a first and second rotor failure, a first and third rotor failure, a first and fourth rotor failure, a second and third rotor failure, and a second and fourth rotor failure. Multiple additional models may be determined including a model for no rotor failure and all rotor failure in addition to a first, second, and third rotor failure and a second, third, and fourth rotor failure. In some embodiments, the number of models determined is equal to the number of actuators squared plus one. In some embodiments, the number of considered failure modes is less than the total possible failure modes. For example, models may not be determined for less likely failure modes in order to limit computations performed. Persons skilled in the art, upon reviewing the entirety of this disclosure, will be aware of various embodiments of failure modes used to identify a defunct actuator consistent with this disclosure. In a non-limiting embodiment, the plurality of expected actuator performance model 120 may be sorted based on similarity to an observed flight datum. For example, an expected flight datum including expected attitude and expected attitude rate given a failure mode is determined or otherwise generated based on and/or for each model. In some embodiments, the models are sorted based on how closely their corresponding expected attitude and expected attitude rate matches the observed attitude and attitude rate. The sorted models may result in a sorted list of failure modes from most likely to least likely. For example, in the event a first rotor failure mode has a corresponding expected attitude that is 0.2 off from the observed attitude and an expected attitude rate that is 0.1 off from the observed attitude rate whereas a second rotor failure mode has a corresponding expected attitude that is 0.7 off from the observed attitude and an expected attitude rate that is 0.9 off from the observed attitude, the first rotor failure is determined to be more likely than the second rotor failure mode. In some embodiments, the summation of the difference between expected attitude and observed attitude and the difference between expected attitude rate and observed attitude rate is used to sort the models. In some embodiments, expected attitude is weighted more than expected attitude rate or vice versa. A model's similarity to observed metrics may be determined using various calculations based on the expected and observed values in various embodiments. In a non-limiting embodiment, controller may identify defunct actuator or one or more defunct actuators based on the sorted model. For example, the failure mode top of the sorted list may be selected. Actuator failures that correspond to the failure mode are determined to be in effect.

Still referring to FIG. 4, method 400, at step 420, includes generating an actuator allocation command datum as a function of at least the actuator performance model and at least the identification of the defunct actuator. Generating actuator allocation command datum may include generating actuator allocation command as a function of a machine-learning model. Generating actuator allocation command datum may include, in part, using an outer loop controller, wherein outer loop controller may be configured to generate rate setpoint as a function of sensor datum and the identification of defunct actuator. Rate setpoint may include any rate setpoint as described herein. Outer loop controller may include one or more computing devices consistent with this disclosure and/or one or more components and/or modules thereof.

Still referring to FIG. 4, method 400, at step 420, may include outer loop controller generating rate setpoint as a function of sensor datum and the identification of defunct actuator. Outer loop controller may include circuitry, components, processors, transceivers, or a combination thereof configured to receive and/or send electrical signals. Outer loop controller may include a proportional-integral-derivative (PID) controller. PID controllers may automatically apply accurate and responsive correction to a control function in a loop, such that over time the correction remains responsive to the previous output and actively controls an output. Controller may include damping, including critical damping to attain the desired setpoint, which may be an output to a propulsor in a timely and accurate way. Outer loop controller may include components, circuitry, receivers, transceivers, or a combination thereof. Outer loop controller may be configured to generate rate setpoint 136 as a function of sensor datum and identification of defunct actuator. In a non-limiting embodiment, controller may use an outer angle loop driving an inner rate loop to provide closed loop control with setpoints of desired pitch attitude, roll attitude, and yaw rate provided directly by the pilot. The outer (angle) loop provides rate setpoint. Rate setpoint may include the desired rate of change of one or more angles describing the aircraft's orientation, heading, and propulsion, or a combination thereof. Rate setpoint may include the pilot's desired rate of change of aircraft pitch angle, consistent with pitch angles, and largely at least an aircraft angle in the entirety of this disclosure. Rate setpoint may include a measurement in a plurality of measurement systems including quaternions or any other measurement system as described herein.

Still referring to FIG. 4, method 400, at step 420, may include using an inner loop controller, wherein inner loop controller may be configured to generate moment datum as a function of rate setpoint. Inner loop controller may include any inner loop controller as described herein. Moment datum may include any moment datum as described herein. Moment datum may include any information describing the moment of an aircraft. Moment datum includes information regarding pilot's desire to apply a certain moment or collection of moments on one or more portions of an electric aircraft, including the entirety of the aircraft.

Still referring to FIG. 4, method 400, at step 420, may include using a mixer, wherein the mixer may be configured to generate actuator allocation command datum as a function of moment datum. The mixer may include any mixer as described herein. In a non-limiting embodiment, moment datum may include a plurality of attitude commands and allocates one or more outgoing signals, such as modified attitude commands and output torque command, or the like, to at least a propulsor, flight component, or one or more computing devices connected thereto. In a non-limiting embodiment, the mixer may be configured to solve at least an optimization problem, which may be an objective function. Objective function may include any objective function as described herein. The mixer may compute a score, metric, ranking, or the like, associated with each performance prognoses and candidate transfer apparatus and select objectives to minimize and/or maximize the score/rank, depending on whether an optimal result may be represented, respectively, by a minimal and/or maximal score; an objective function may be used by mixer to score each possible pairing. At least an optimization problem may be based on one or more objectives. In a non-limiting embodiment, the mixer may be configured to generate actuator allocation command datum as a function of the torque allocation. Actuator allocation command datum may include at least a torque vector. Actuator allocation command datum may be represented in any suitable form, which may include, without limitation, vectors, matrices, coefficients, scores, ranks, or other numerical comparators, and the like.

Still referring to FIG. 4, method 400, at step 425, includes performing a torque allocation as a function of the actuator allocation command datum. In a non-limiting embodiment, performing the torque allocation may include commanding one or more actuators to apply a specific amount of torque. In a non-limiting embodiment, actuator allocation command datum may include unique torque allocations for each actuator to be executed. For example and without limitation, actuator allocation command datum may instruct each functioning actuator to allocate a torque output of 4 Nm and instruct defunct actuator 128 to allocate a torque output of 0.4 Nm. For example and without limitation, actuator allocation command datum may instruct one or more defunct actuators to command a torque of 0 Nm and the remaining functioning actuators a torque of 6 Nm. In a non-limiting embodiment, actuator allocation command datum may be generated as a function of a torque allocation.

Figure 5:
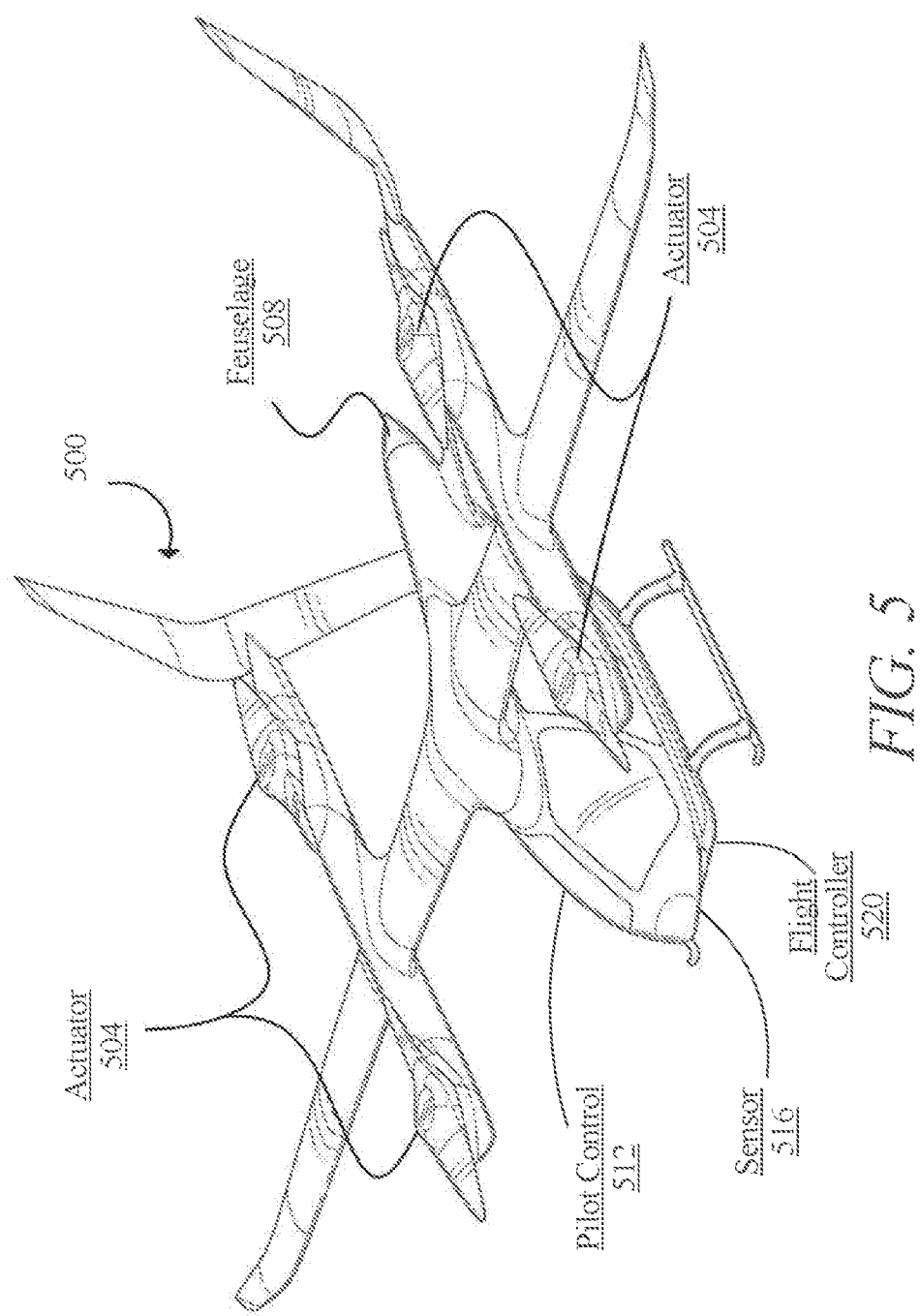
FIG. 5 is an illustration of an exemplary embodiment of an electric aircraft.

Referring now to FIG. 5, an exemplary embodiment of an aircraft 500, which may include, or be incorporated with, a system for optimization of a recharging flight plan is illustrated. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like thereof.

Still referring to FIG. 5, aircraft 500 may include an electrically powered aircraft. In embodiments, electrically powered aircraft may be an electric vertical takeoff and landing (eVTOL) aircraft. Aircraft 500 may include an unmanned aerial vehicle and/or a drone. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate the plane to a flight speed on takeoff and decelerate the plane after landing. In an embodiment, and without limitation, electric aircraft may be configured with an electric propulsion assembly. Electric propulsion assembly may include any electric propulsion assembly as described in U.S. Nonprovisional application Ser. No. 16/703,225, and entitled "AN INTEGRATED ELECTRIC PROPULSION ASSEMBLY," the entirety of which is incorporated herein by reference. For purposes of description herein, the terms "upper", "lower", "left", "rear", "right", "front", "vertical", "horizontal", "upward", "downward", "forward", "backward" and derivatives thereof shall relate to the invention as oriented in FIG. 5.

Still referring to FIG. 5, aircraft 500 includes a fuselage 504. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 504 may include structural elements that physically support a shape and structure of an aircraft. Structural elements may take a plurality of forms, alone or in combination with other types. Structural elements may vary depending on a construction type of aircraft such as without limitation a fuselage 504. Fuselage 504 may comprise a truss structure. A truss structure may be used with a lightweight aircraft and comprises welded steel tube trusses. A "truss," as used in this disclosure, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later herein.

In embodiments, and with continued reference to FIG. 5, aircraft fuselage 504 may include and/or be constructed using geodesic construction. Geodesic structural elements may include stringers wound about formers (which may be alternatively called station frames) in opposing spiral directions. A "stringer," as used in this disclosure, is a general structural element that includes a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 504 orthogonal to a longitudinal (nose to tail) axis of the aircraft and may form a general shape of fuselage 504. A former may include differing cross-sectional shapes at differing locations along fuselage 504, as the former is the structural element that informs the overall shape of a fuselage 504 curvature. In embodiments, aircraft skin may be anchored to formers and strings such that the outer mold line of a volume encapsulated by formers and stringers comprises the same shape as aircraft 500 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be mechanically coupled to underlying stringers and formers and may interact with a fluid, such as air, to generate lift and perform maneuvers.

In an embodiment, and still referring to FIG. 5, fuselage 504 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, and further referring to FIG. 5, fuselage 504 may include a semi-monocoque construction. Semi-monocoque construction, as used herein, is a partial monocoque construction, wherein a monocoque construction is describe above detail. In semi-monocoque construction, aircraft fuselage 504 may derive some structural support from stressed aircraft skin and some structural support from underlying frame structure made of structural elements. Formers or station frames can be seen running transverse to the long axis of fuselage 504 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of the aforementioned components like screws, nails, dowels, pins, anchors, adhesives like glue or epoxy, or bolts and nuts, to name a few. A subset of fuselage under the umbrella of semi-monocoque construction includes unibody vehicles.

Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 5, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 5, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 504. Monocoque comprises only structural skin, and in that sense, aircraft skin undergoes stress by applied aerodynamic fluids imparted by the fluid. Stress as used in continuum mechanics may be described in pound-force per square inch (lbf/in$^2$) or Pascals (Pa). In semi-monocoque construction stressed skin may bear part of aerodynamic loads and additionally may impart force on an underlying structure of stringers and formers.

Still referring to FIG. 5, it should be noted that an illustrative embodiment is presented only, and this disclosure in no way limits the form or construction method of a system and method for loading payload into an eVTOL aircraft. In embodiments, fuselage 504 may be configurable based on the needs of the eVTOL per specific mission or objective. The general arrangement of components, structural elements, and hardware associated with storing and/or moving a payload may be added or removed from fuselage 504 as needed, whether it is stowed manually, automatedly, or removed by personnel altogether. Fuselage 504 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 504 may also be configurable to accept certain specific cargo containers, or a receptacle that can, in turn, accept certain cargo containers.

Still referring to FIG. 5, aircraft 500 may include a plurality of laterally extending elements attached to fuselage 504. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section geometry may comprise an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 5, aircraft 500 includes a plurality of flight components 508. As used in this disclosure a "flight component" is a component that promotes flight and guidance of an aircraft. In an embodiment, flight component 508 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 5, plurality of flight components 508 may include at least a lift propulsor component 512. As used in this disclosure a "lift propulsor component" is a component and/or device used to propel a craft upward by exerting downward force on a fluid medium, which may include a gaseous medium such as air or a liquid medium such as water. Lift propulsor component 512 may include any device or component that consumes electrical power on demand to propel an electric aircraft in a direction or other vehicle while on ground or in-flight. For example, and without limitation, lift propulsor component 512 may include a rotor, propeller, paddle wheel and the like thereof, wherein a rotor is a component that produces torque along the longitudinal axis, and a propeller produces torquer along the vertical axis. In an embodiment, lift propulsor component 512 includes a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift propulsor component 512 may include a rotating power-driven hub, to which are attached several radial airfoil-section blades such that the whole assembly rotates about a longitudinal axis. Blades may be configured at an angle of attack, wherein an angle of attack is described in detail below. In an embodiment, and without limitation, angle of attack may include a fixed angle of attack. As used in this disclosure a "fixed angle of attack" is fixed angle between a chord line of a blade and relative wind. As used in this disclosure a "fixed angle" is an angle that is secured and/or unmovable from the attachment point. For example, and without limitation fixed angle of attack may be 3.2° as a function of a pitch angle of 19.7° and a relative wind angle 16.5°. In another embodiment, and without limitation, angle of attack may include a variable angle of attack. As used in this disclosure a "variable angle of attack" is a variable and/or moveable angle between a chord line of a blade and relative wind. As used in this disclosure a "variable angle" is an angle that is moveable from an attachment point. For example, and without limitation variable angle of attack may be a first angle of 4.7° as a function of a pitch angle of 17.1° and a relative wind angle 16.4°, wherein the angle adjusts and/or shifts to a second angle of 16.7° as a function of a pitch angle of 16.1° and a relative wind angle 16.4°. In an embodiment, angle of attack be configured to produce a fixed pitch angle. As used in this disclosure a "fixed pitch angle" is a fixed angle between a cord line of a blade and the rotational velocity direction. For example, and without limitation, fixed pitch angle may include 18°. In another embodiment fixed angle of attack may be manually variable to a few set positions to adjust one or more lifts of the aircraft prior to flight. In an embodiment, blades for an aircraft are designed to be fixed to their hub at an angle similar to the thread on a screw makes an angle to the shaft; this angle may be referred to as a pitch or pitch angle which will determine a speed of forward movement as the blade rotates.

In an embodiment, and still referring to FIG. 5, lift propulsor component 512 may be configured to produce a lift. As used in this disclosure a "lift" is a perpendicular force to the oncoming flow direction of fluid surrounding the surface. For example, and without limitation relative air speed may be horizontal to aircraft 500, wherein lift force may be a force exerted in a vertical direction, directing aircraft 500 upwards. In an embodiment, and without limitation, lift propulsor component 512 may produce lift as a function of applying a torque to lift propulsor component. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, one or more flight components such as a power sources may apply a torque on lift propulsor component 512 to produce lift. As used in this disclosure a "power source" is a source that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking.

Still referring to FIG. 5, power source may include an energy source. An energy source may include, for example, an electrical energy source a generator, a photovoltaic device, a fuel cell such as a hydrogen fuel cell, direct methanol fuel cell, and/or solid oxide fuel cell, an electric energy storage device (e.g., a capacitor, an inductor, and/or a battery). An electrical energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 500 may be incorporated.

In an embodiment, and still referring to FIG. 5, an energy source may be used to provide a steady supply of electrical power to a load over the course of a flight by a vehicle or other electric aircraft. For example, an energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, an energy source may be capable of providing sufficient electrical power for auxiliary loads including without limitation, lighting, navigation, communications, de-icing, steering or other systems requiring power or energy. Further, an energy source may be capable of providing sufficient power for controlled descent and landing protocols, including, without limitation, hovering descent or runway landing. As used herein an energy source may have high power density where electrical power an energy source can usefully produce per unit of volume and/or mass is relatively high. "Electrical power," as used in this disclosure, is defined as a rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 5, an energy source may include a plurality of energy sources, referred to herein as a module of energy sources. A module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce an overall power output as a voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on measurement of at least an electrical parameter. In an embodiment where an energy source includes a plurality of battery cells, overall power output capacity may be dependent on electrical parameters of each individual cell. If one cell experiences high self-discharge during demand, power drawn from at least an energy source may be decreased to avoid damage to the weakest cell. An energy source may further include, without limitation, wiring, conduit, housing, cooling system and battery management system. Persons skilled in the art will be aware, after reviewing the entirety of this disclosure, of many different components of an energy source.

In an embodiment and still referring to FIG. 5, plurality of flight components 508 may be arranged in a quad copter orientation. As used in this disclosure a "quad copter orientation" is at least a lift propulsor component oriented in a geometric shape and/or pattern, wherein each of the lift propulsor components are located along a vertex of the geometric shape. For example, and without limitation, a square quad copter orientation may have four lift propulsor components oriented in the geometric shape of a square, wherein each of the four lift propulsor components are located along the four vertices of the square shape. As a further non-limiting example, a hexagonal quad copter orientation may have six lift propulsor components oriented in the geometric shape of a hexagon, wherein each of the six lift propulsor components are located along the six vertices of the hexagon shape. In an embodiment, and without limitation, quad copter orientation may include a first set of lift propulsor components and a second set of lift propulsor components, wherein the first set of lift propulsor components and the second set of lift propulsor components may include two lift propulsor components each, wherein the first set of lift propulsor components and a second set of lift propulsor components are distinct from one another. For example, and without limitation, the first set of lift propulsor components may include two lift propulsor components that rotate in a clockwise direction, wherein the second set of lift propulsor components may include two lift propulsor components that rotate in a counterclockwise direction. In an embodiment, and without limitation, the first set of propulsor lift components may be oriented along a line oriented 45° from the longitudinal axis of aircraft 500. In another embodiment, and without limitation, the second set of propulsor lift components may be oriented along a line oriented 135° from the longitudinal axis, wherein the first set of lift propulsor components line and the second set of lift propulsor components are perpendicular to each other.

Still referring to FIG. 5, plurality of flight components 508 may include a pusher component 516. As used in this disclosure a "pusher component" is a component that pushes and/or thrusts an aircraft through a medium. As a non-limiting example, pusher component 516 may include a pusher propeller, a paddle wheel, a pusher motor, a pusher propulsor, and the like. Additionally, or alternatively, pusher flight component may include a plurality of pusher flight components. Pusher component 516 is configured to produce a forward thrust. As used in this disclosure a "forward thrust" is a thrust that forces aircraft through a medium in a horizontal direction, wherein a horizontal direction is a direction parallel to the longitudinal axis. As a non-limiting example, forward thrust may include a force of 1145 N to force aircraft to in a horizontal direction along the longitudinal axis. As a further non-limiting example, forward thrust may include a force of, as a non-limiting example, 300 N to force aircraft 500 in a horizontal direction along a longitudinal axis. As a further non-limiting example, pusher component 516 may twist and/or rotate to pull air behind it and, at the same time, push aircraft 500 forward with an equal amount of force. In an embodiment, and without limitation, the more air forced behind aircraft, the greater the thrust force with which the aircraft is pushed horizontally will be. In another embodiment, and without limitation, forward thrust may force aircraft 500 through the medium of relative air. Additionally or alternatively, plurality of flight components 508 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

In an embodiment and still referring to FIG. 5, aircraft 500 may include a flight controller located within fuselage 504, wherein a flight controller is described in detail below, in reference to FIG. 5. In an embodiment, and without limitation, flight controller may be configured to operate a fixed-wing flight capability. As used in this disclosure a "fixed-wing flight capability" is a method of flight wherein the plurality of laterally extending elements generate lift. For example, and without limitation, fixed-wing flight capability may generate lift as a function of an airspeed of aircraft 100 and one or more airfoil shapes of the laterally extending elements, wherein an airfoil is described above in detail. As a further non-limiting example, flight controller may operate the fixed-wing flight capability as a function of reducing applied torque on lift propulsor component 512. For example, and without limitation, flight controller may reduce a torque of 19 Nm applied to a first set of lift propulsor components to a torque of 16 Nm. As a further non-limiting example, flight controller may reduce a torque of 12 Nm applied to a first set of lift propulsor components to a torque of 0 Nm. In an embodiment, and without limitation, flight controller may produce fixed-wing flight capability as a function of increasing forward thrust exerted by pusher component 516. For example, and without limitation, flight controller may increase a forward thrust of 500 kN produced by pusher component 516 to a forward thrust of 1669 kN. In an embodiment, and without limitation, an amount of lift generation may be related to an amount of forward thrust generated to increase airspeed velocity, wherein the amount of lift generation may be directly proportional to the amount of forward thrust produced. Additionally or alternatively, flight controller may include an inertia compensator. As used in this disclosure an "inertia compensator" is one or more computing devices, electrical components, logic circuits, processors, and the like there of that are configured to compensate for inertia in one or more lift propulsor components present in aircraft 500. Inertia compensator may alternatively or additionally include any computing device used as an inertia compensator as described in U.S. Nonprovisional application Ser. No. 17/106,557, and entitled "SYSTEM AND METHOD FOR FLIGHT CONTROL IN ELECTRIC AIRCRAFT," the entirety of which is incorporated herein by reference.

In an embodiment, and still referring to FIG. 5, flight controller may be configured to perform a reverse thrust command. As used in this disclosure a "reverse thrust command" is a command to perform a thrust that forces a medium towards the relative air opposing aircraft 190. For example, reverse thrust command may include a thrust of 180 N directed towards the nose of aircraft to at least repel and/or oppose the relative air. Reverse thrust command may alternatively or additionally include any reverse thrust command as described in U.S. Nonprovisional application Ser. No. 17/319,155 and entitled "AIRCRAFT HAVING REVERSE THRUST CAPABILITIES," the entirety of which is incorporated herein by reference. In another embodiment, flight controller may be configured to perform a regenerative drag operation. As used in this disclosure a "regenerative drag operation" is an operating condition of an aircraft, wherein the aircraft has a negative thrust and/or is reducing in airspeed velocity. For example, and without limitation, regenerative drag operation may include a positive propeller speed and a negative propeller thrust. Regenerative drag operation may alternatively or additionally include any regenerative drag operation as described in U.S. Nonprovisional application Ser. No. 17/319,155.

In an embodiment, and still referring to FIG. 5, flight controller may be configured to perform a corrective action as a function of a failure event. As used in this disclosure a "corrective action" is an action conducted by the plurality of flight components to correct and/or alter a movement of an aircraft. For example, and without limitation, a corrective action may include an action to reduce a yaw torque generated by a failure event. Additionally or alternatively, corrective action may include any corrective action as described in U.S. Nonprovisional application Ser. No. 17/222,539, and entitled "AIRCRAFT FOR SELF-NEUTRALIZING FLIGHT," the entirety of which is incorporated herein by reference. As used in this disclosure a "failure event" is a failure of a lift propulsor component of the plurality of lift propulsor components. For example, and without limitation, a failure event may denote a rotation degradation of a rotor, a reduced torque of a rotor, and the like thereof.

Figure 6:
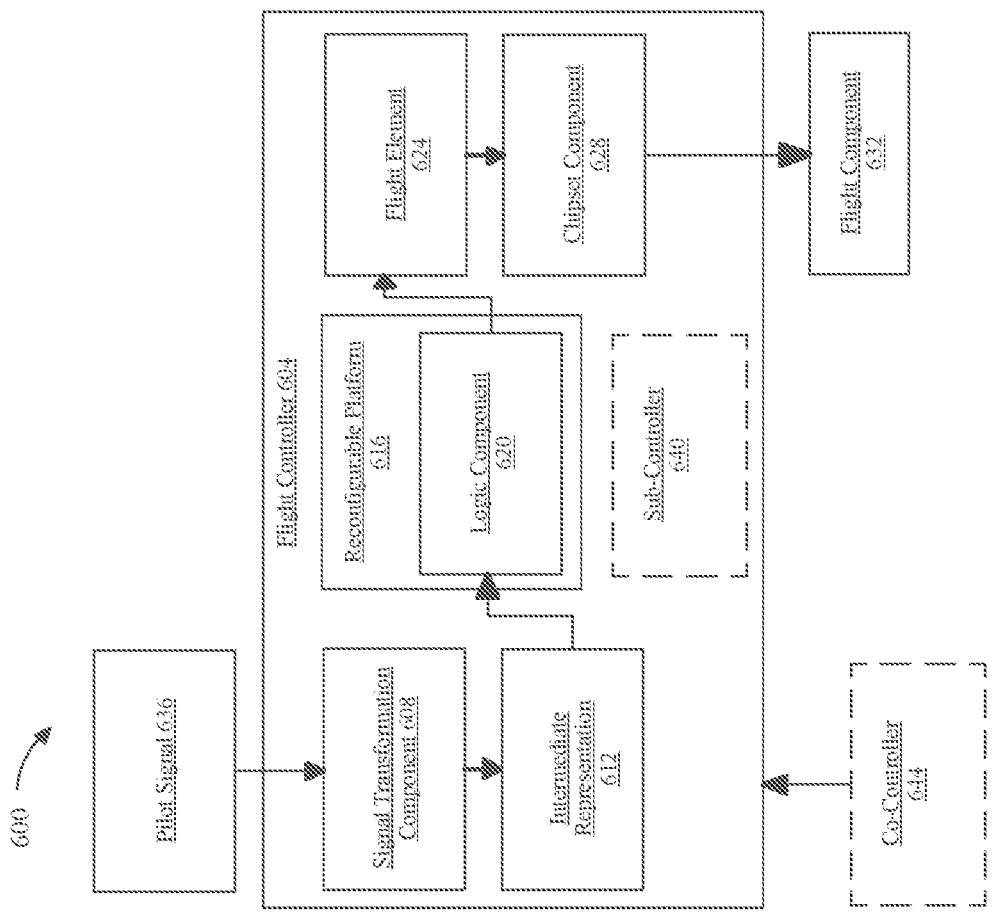
FIG. 6 is a block diagram of an exemplary flight controller.

Now referring to FIG. 6, an exemplary embodiment 600 of a flight controller 604 is illustrated. As used in this disclosure a "flight controller" is a computing device of a plurality of computing devices dedicated to data storage, security, distribution of traffic for load balancing, and flight instruction. Flight controller 604 may include and/or communicate with any computing device as described in this disclosure, including without limitation a microcontroller, microprocessor, digital signal processor (DSP) and/or system on a chip (SoC) as described in this disclosure. Further, flight controller 604 may include a single computing device operating independently, or may include two or more computing device operating in concert, in parallel, sequentially or the like; two or more computing devices may be included together in a single computing device or in two or more computing devices. In embodiments, flight controller 604 may be installed in an aircraft, may control the aircraft remotely, and/or may include an element installed in the aircraft and a remote element in communication therewith.

In an embodiment, and still referring to FIG. 6, flight controller 604 may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 19-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a data-flow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller 604. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller 604 may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller 604. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

In an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller 604 may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component. As used in this disclosure a "flight component" is a portion of an aircraft that can be moved or adjusted to affect one or more flight elements. For example, flight component may include a component used to affect the aircrafts' roll and pitch which may comprise one or more ailerons. As a further example, flight component may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller 604 may be configured generate an autonomous function. As used in this disclosure an "autonomous function" is a mode and/or function of flight controller 604 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 604 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 604 will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller 604 may generate autonomous function as a function of an autonomous machine-learning model. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller 604 to control and/or maintain a portion of aircraft, a portion of the flight plan, the entire aircraft, and/or the entire flight plan. As a further non-limiting example, pilot signal 636 may include an implicit signal, wherein flight controller 604 detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller 604 and/or a remote device may or may not use in the generation of autonomous function. As used in this disclosure "remote device" is an external device to flight controller 604. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 604 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller 604 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 604. Remote device and/or FPGA may transmit a signal, bit, datum, or parameter to flight controller 604 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 604 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller 604 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller 604 may include, but is not limited to, for example, a cluster of flight controllers in a first location and a second flight controller or cluster of flight controllers in a second location. Flight controller 604 may include one or more flight controllers dedicated to data storage, security, distribution of traffic for load balancing, and the like. Flight controller 604 may be configured to distribute one or more computing tasks as described below across a plurality of flight controllers, which may operate in parallel, in series, redundantly, or in any other manner used for distribution of tasks or memory between computing devices. For example, and without limitation, flight controller 604 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 604. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller 604 may also be implemented using a "shared nothing" architecture in which data is cached at the worker, in an embodiment, this may enable scalability of aircraft and/or computing device. Flight controller 604 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller 604 may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller 604 as components and/or nodes of a distributer flight controller as described above. For example, and without limitation, co-controller 644 may include one or more controllers and/or components that are similar to flight controller 604. As a further non-limiting example, co-controller 644 may include any controller and/or component that joins flight controller 604 to distributer flight controller. As a further non-limiting example, co-controller 644 may include one or more processors, logic components and/or computing devices capable of receiving, processing, and/or transmitting data to and/or from flight controller 604 to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller 604 may be designed and/or configured to perform any method, method step, or sequence of method steps in any embodiment described in this disclosure, in any order and with any degree of repetition. For instance, flight controller 604 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
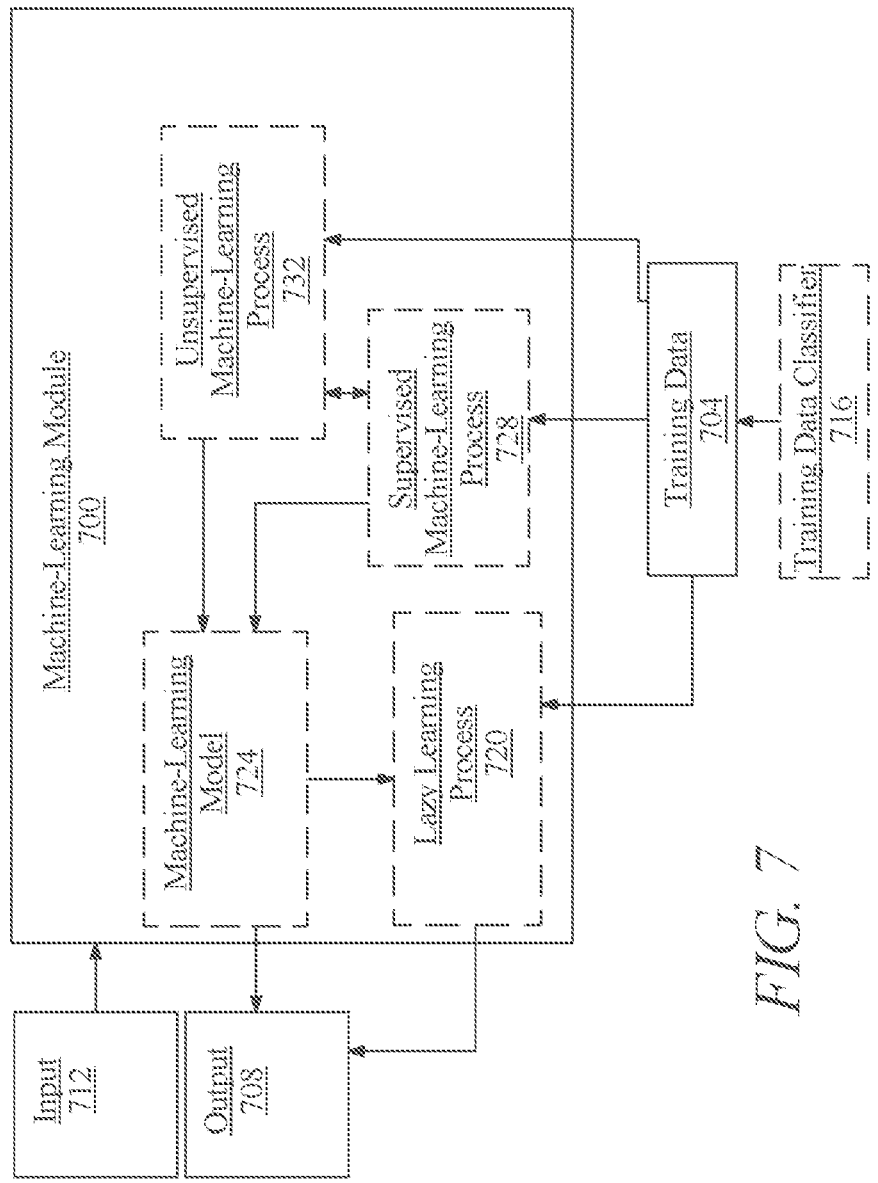
FIG. 7 is a block diagram of an exemplary machine-learning process.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example, sensor datum, defunct actuator, and any actuator performance model may be inputs and an actuator allocation command datum may be an output.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to various levels of severity of a malfunction for one or more defunct actuators for which a subset of training data may be selected.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include a sensor datum, a defunct actuator, and any actuator performance model as inputs, actuator allocation command datum as an output, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
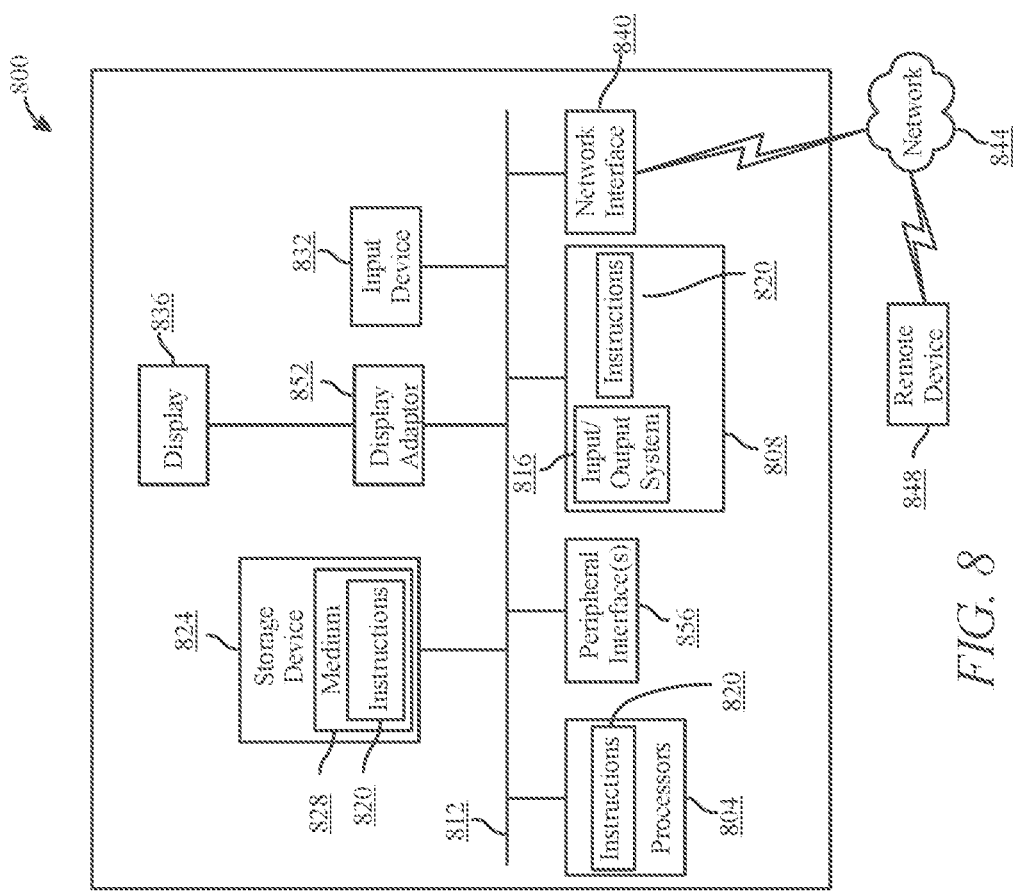
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for flight control for managing actuators for an electric aircraft, the system comprising:
    at least a torque sensor configured to detect a sensor datum, wherein the sensor datum comprises an actuator torque datum from at least one actuator of a plurality of lift propulsor actuators on an electric aircraft;
    a controller, wherein the controller is designed and configured to:
        generate an actuator performance model as a function of measured sensor data during at least a previous aircraft flight;
        receive the sensor datum from the at least a torque sensor;
        identify a defunct actuator of the plurality of lift propulsor actuators as a function of the sensor datum and the actuator performance model;
        generate an actuator allocation command datum as a function of at least the actuator performance model and at least the identification of the defunct actuator, wherein the actuator allocation command datum comprises a command for a torque allocation to be applied to one or more actuators of the plurality of actuators; and
        perform the torque allocation on the one or more actuators of the plurality of actuators as a function of the actuator allocation command datum.

2. The system of claim 1, wherein the sensor datum further comprises an input datum from a manipulation of a pilot input control and a flight datum describing logistical and/or physical parameters of the electric aircraft.

3. The system of claim 1, wherein the at least a sensor is disposed on at least an actuator of the electric aircraft.

4. The system of claim 1, wherein the controller further comprises a flight simulator to simulate flight within an environment, wherein the flight simulator is configured to generate the actuator performance model.

5. The system of claim 1, wherein the controller is further configured to generate an expected actuator performance model which embodies ideal actuator performance on the electric aircraft.

6. The system of claim 5, wherein the controller is further configured to compare the actuator performance model with the expected actuator performance model to identify the defunct actuator.

7. The system of claim 1, wherein the controller further comprises an outer loop controller configured to generate a rate setpoint as a function of the sensor datum and the identification of the defunct actuator.

8. The system of claim 7, wherein the controller further comprises an inner loop controller configured to generate a moment datum as a function of the rate setpoint.

9. The system of claim 8, wherein the controller further comprises a mixer configured to at least generate the actuator allocation command datum.

10. The system of claim 1, wherein controller is further configured to use a machine-learning model to generate the actuator allocation command datum as an output using the actuator performance model and at least the sensor datum as inputs.

11. A method for flight control for managing actuators for an electric aircraft, the method comprising:
    detecting, by a torque sensor, a sensor datum comprising an actuator torque datum from at least one actuator of a plurality of lift propulsor actuators on an electric aircraft;
    generating, by a controller, an actuator performance model as a function of measured sensor data during at least a previous aircraft flight;
    receiving, by a controller, a sensor datum from at least a torque sensor;
    identifying, by a controller, a defunct actuator of the plurality of lift propulsor actuators as a function of the sensor datum and the actuator performance model;
    generating, by a controller, an actuator allocation command datum as a function of at least the actuator performance model and at least the identification of the defunct actuator; and
    performing, by a controller, the torque allocation on the one or more actuators of the plurality of actuators as a function of the actuator allocation command datum.

12. The method of claim 11, wherein receiving the sensor datum further comprises receiving an input datum from a manipulation of a pilot input control and a flight datum describing logistical and/or physical parameters of the electric aircraft.

13. The method of claim 11, wherein receiving the sensor datum further comprises the at least a sensor configured to be disposed on at least an actuator of the electric aircraft.

14. The method of claim 11, wherein the controller further comprises a flight simulator to simulate flight within an environment, wherein the flight simulator is configured to generate the actuator performance model.

15. The method of claim 14, wherein generating the actuator performance model further comprises generating an expected actuator performance model as a function of the flight simulator, which embodies ideal actuator performance on the electric aircraft.

16. The method of claim 15, wherein identifying the defunct actuator further comprises comparing the actuator performance model with the expected actuator performance model.

17. The method of claim 11, wherein the method further comprises generating a rate setpoint by an outer loop controller as a function of the sensor datum the identification of the defunct actuator.

18. The method of claim 17, wherein the method further comprises generating a moment datum, by an inner loop controller, as a function of the rate setpoint.

19. The system of claim 18, wherein the method further comprises generating the actuator allocation command datum by a mixer.

20. The method of claim 11, wherein generating the actuator allocation command further comprises using a machine-learning model to generate the actuator allocation command datum as an output using the actuator performance model and at least the sensor datum as inputs.

* * * * *